United States Patent
Goffin et al.

(10) Patent No.: US 12,116,467 B2
(45) Date of Patent: Oct. 15, 2024

(54) FOAMABLE CROSSLINKABLE POLYMER COMPOSITION CONTAINING A FUNCTIONALIZED PARTICULATE BICARBONATE AS BLOWING AGENT AND METHOD FOR MANUFACTURING A CROSSLINKED FOAMED POLYMER THEREFROM

(71) Applicant: SOLVAY SA, Brussels (BE)

(72) Inventors: Anne-Lise Goffin, Rebaix (BE); Alberto Galasco, Oleggio (IT); Didier Boulanger, Rebecq (BE); Eduardo Lopez Gonzalez, Valladolid (ES); Miguel A. Rodriguez Perez, Valladolid (ES); Cristina Saiz Arroyo, Valladolid (ES)

(73) Assignee: Solvay SA, Brussels (BE)

( * ) Notice: Subject to any disclaimer, the term of this patent is extended or adjusted under 35 U.S.C. 154(b) by 699 days.

(21) Appl. No.: 17/284,885

(22) PCT Filed: Oct. 15, 2019

(86) PCT No.: PCT/EP2019/077904
§ 371 (c)(1),
(2) Date: Apr. 13, 2021

(87) PCT Pub. No.: WO2020/078963
PCT Pub. Date: Apr. 23, 2020

(65) Prior Publication Data
US 2021/0388167 A1 Dec. 16, 2021

(30) Foreign Application Priority Data
Oct. 15, 2018 (EP) .................................... 18200470

(51) Int. Cl.
*C08J 9/08* (2006.01)
*C08J 3/24* (2006.01)
*C08J 9/00* (2006.01)

(52) U.S. Cl.
CPC . *C08J 9/08* (2013.01); *C08J 3/24* (2013.01); *C08J 9/0023* (2013.01); *C08J 9/0061* (2013.01); *C08J 2201/026* (2013.01); *C08J 2203/02* (2013.01); *C08J 2323/02* (2013.01); *C08J 2331/04* (2013.01); *C08J 2423/02* (2013.01); *C08J 2431/04* (2013.01); *C08J 2493/04* (2013.01)

(58) Field of Classification Search
CPC ..... C08J 9/08; C08J 3/24; C08J 9/0023; C08J 9/0061; C08J 2201/06; C08J 2203/02; C08J 2323/02; C08J 2331/04; C08J 2423/02; C08J 2431/04; C08J 2493/04; C08J 2353/00; C08J 2453/00
See application file for complete search history.

(56) References Cited

U.S. PATENT DOCUMENTS

2017/0002164 A1   1/2017   Kohlstrung et al.

FOREIGN PATENT DOCUMENTS

| CN | 103881238 A1 | 6/2014 | |
| EP | 3037388 A1 * | 6/2016 | ........... A23L 29/015 |
| JP | 2017-510695 A | 4/2017 | |
| WO | 90/14384 A1 | 11/1990 | |
| WO | 2014141759 A1 | 9/2014 | |
| WO | 2018/15506 A1 | 1/2018 | |
| WO | WO-2018015506 A1 * | 1/2018 | .............. C08J 3/226 |
| WO | WO-2019016355 A1 * | 1/2019 | ............ C08J 9/0042 |

OTHER PUBLICATIONS

Data sheet for "BYK-3155 Silicone-free polymer-based air release additive for PVC plastisols. Standard additive, all-purpose"., Issued on Sep. 2013 from BYK Additives and Instuments, accessed online on Mar. 6, 2017 via https://www.byk.com/en/additives/additives-by-name/byk-3155.php.
Information sheet BICAR(R) FOAM product@solvay.com, extracted online via solvay.com on Jul. 18, 2016.
Astm C690-09 (2009 ; re-approved in 2019)—Standard Test Method for Particle Size Distribution of Alumina or Quartz Powders by Electrical Sensing Zone Technique, Page Count: 4.
Standard ISO 868:2003: Plastics and ebonite—Determination of indentation hardness by means of a durometer (Shore hardness)—CORR 14577: Jul. 11, 2003.
ISO 5794-1 standard, annex D Rubber compounding ingredients—Silica, precipitated, hydrated—Part 1: Non-rubber tests—Fourth Edition, Mar. 15, 2010, Page Count: 36.
Commission Directive 2004/1/EC of Jan. 6, 2004 amending Directive 2002/72/EC as regards the suspension of the use of azodicarbonamide as blowing agent.
Bicar® 0/4 AD by Solvay https://www.solvay.com/en/brands/bicar. Hydrocerol® BIF (4.5%) by Clariant https://polymer-additives.specialchem.com/product/a-clariant-hydrocerol.

(Continued)

*Primary Examiner* — K. Boyle
(74) *Attorney, Agent, or Firm* — Osha Bergman Watanabe & Burton LLP

(57) ABSTRACT

A foamable polymer composition comprising a crosslinkable polymer, a crosslinking peroxide compound, and a chemical blowing agent comprising a functionalized particulate bicarbonate containing at least one additive. The additive may be selected from the group consisting of a fatty acid, a rosin acid, any derivative thereof, and salts thereof; or any combinations thereof, such as comprising abietic acid, dihydroabietic acid, neoabietic acid, a rosin acid ester, linoleic acid, or mixtures thereof. The particulate bicarbonate may be preferably functionalized by spray-coating, extrusion or co-grinding with at least one additive. The functionalized particulate bicarbonate may further comprise 0.1-5 wt % silica. A process for manufacturing a foamed crosslinked polymer, such as EVA and/or crosslinked polyolefins, and a foamed crosslinked polymer obtained by such process.

17 Claims, 8 Drawing Sheets

(56) References Cited

OTHER PUBLICATIONS

Resigral® 52 supplied by Les Derives Resiniques Et Terpeniques (DRT) https://adhesives.specialchem.com/product/a-drt-resigral-52.
Tixosil® 38AB produced by Rhodia (owned by Solvay) https://www.solvay.com/en/product/tixosil-38ab.
Notice of Reasons for Refusal issued in Japanese Application No. 2021-520186 mailed on Feb. 27, 2024 (6 pages).

* cited by examiner

ADCA　　　　　FB-BA 2

FOAMABLE CROSSLINKABLE POLYMER COMPOSITION CONTAINING A FUNCTIONALIZED PARTICULATE BICARBONATE AS BLOWING AGENT AND METHOD FOR MANUFACTURING A CROSSLINKED FOAMED POLYMER THEREFROM

CROSS-REFERENCE TO RELATED APPLICATIONS

The present application is a U.S. national stage entry under 35 U.S.C. § 371 of International Application No. PCT/EP2019/077904 filed Oct. 15, 2019, which claims priority to European application No. 18200470.5 filed Oct. 15, 2018, the whole content of this application being incorporated herein by reference for all purposes.

STATEMENT REGARDING FEDERALLY SPONSORED RESEARCH OR DEVELOPMENT

Not applicable.

TECHNICAL FIELD OF THE INVENTION

The invention relates to a foamable polymer composition containing a crosslinkable polymer, such as ethylene/vinyl acetate copolymers (EVA), polyolefins, olefin block copolymers, or combinations thereof, and a functionalized particulate bicarbonate, and to methods for manufacturing a crosslinked foamed polymer using such foamable polymer composition.

BACKGROUND

Polymer foams are found virtually everywhere in our modern world and are used in a wide variety of applications such as disposable packaging of fast-food, the cushioning of furniture and insulation material.

Polymer foams are made up of a solid and gas phase mixed together to form a foam. By combining the two phases fast results in foaming and forming a polymer matrix with either gas bubbles or gas tunnels incorporated in it, which is known as either closed-cell or open-cell structure. Closed-cell foams are generally more rigid, while open-cell foams are usually flexible.

The gas that is used in the foam is termed a blowing agent, and can be either chemical or physical. Chemical blowing agents are chemicals that take part in a reaction or decompose, giving off a gas in the process. Physical blowing agents are gases that do not react chemically in the foaming process and are therefore inert to the polymer forming the matrix.

For the processing of thermoplastic materials, such as polyvinyl chloride (PVC) or polyolefins (PO, PE, PP), styrenics (PS, ABS, ASA, SAN) and natural and synthetic rubber such as nitrile butadiene rubber (NBR) or chloroprene rubber (CR), chemical blowing agents are used for decades. Chemical blowing agents are additives in the manufacturing of foamed thermoplastic polymers. Chemical blowing agents are stable at room temperature but decompose at elevated temperatures during the processing of the polymers while generating gas. This gas creates a foam structure in the thermoplastic polymer. Chemical blowing agents are used in a wide variety of applications including the production of foamed wall papers, artificial leather, floor and wall coverings, carpet backings, thermal insulation materials, insulation sealants, footwear, automotive components, cable insulation, and packaging materials.

Established blowing agents are exothermic blowing agents such as azodicarbonic acid diamide (azodicarbonamide, ADC, ADCA, CAS No. 123-77-3), the sulfonhydrazides 4,4'-oxybis(benzenesulfonylhydrazide) (OBSH, CAS No. 80-51-3) and p-toluenesulfonylhydrazide, (TSH, CAS No. 1576-35-8) and endothermic blowing agents such as carbonates, like sodium bicarbonate (SBC, $NaHCO_3$, CAS No. 144-55-8), and citric acid and its esters.

Since many years, azodicarbonamide (ADCA) is one of the most effective and widely used chemical blowing agents for use in cellular thermoplastic and rubber applications (cf. for example DE-AS 1 037 700). Azodicarbonamide decomposes on heating to give a high volume of gas, which consists mainly of nitrogen and carbon monoxide. These decomposition products are suitable to create a fine and uniform cell structured foam with a little shrink, a property which is fundamental in the production of soft foams or rubber foams. The decomposition temperature of azodicarbonamide can be reduced from 200-220 degrees centigrade to as low as 125 degrees centigrade by the addition of suitable activators (kickers), but useful decomposition rates are usually only achieved at 140 degrees centigrade and above. Activators or kickers are additives known in the art which are used to influence the decomposition temperature and rate of gas release of the blowing agent.

Azodicarbonamide as a blowing agent in plastics has been banned in the European Union since August 2005 for the manufacture of plastic articles that are intended to come into direct contact with food (COMMISSION DIRECTIVE 2004/1/EC of 6 Jan. 2004 amending Directive 2002/72/EC as regards the suspension of the use of azodicarbonamide as blowing agent". Official Journal of the European Union. 2004-01-13).

There is a need for substitutes for ADCA having the same beneficial performance, especially for applications in foamed thermoplastic crosslinked polymers, such as ethylene/vinyl acetate copolymers (EVA) and crosslinked polyolefins (XLPO).

If the most frequent used blowing agent, ADCA, is facing more and more challenges due to high concerns regarding safe and sustainable use of such additive in polymer formulations for example, then the demand for finding a suitable replacement to ADCA would be expected to increase. At any rate, for regions where the regulations are not as stringent, partial or total substitution of ADCA with a cost-effective, eco-friendly blowing agent alternative would provide an avenue for an end-user's sustainability strategy and align with the overall trend to phase out such substance which is viewed as of high concern.

Possible alternative solutions are provided by the classes of sulfonylhydrazides and carbonates, but these substances exhibit some disadvantages when used as blowing agents, especially when used for applications in plasticized, soft PVC.

p-Toluenesulfonylhydrazide (TSH) starts decomposition at a temperature of about 105 degrees centigrade, which is considered as being too low for the processing of rigid and plasticized PVC. 4,4'-Oxybis(benzenesulfonylhydrazide) (OBSH) also releases nitrogen upon decomposition but the gas generation characteristic is different to that of azodicarbonamide. At temperatures above the decomposition point of OBSH the nitrogen release is rapid, but occurs at a different temperature compared to azodicarbonamide. Below the absolute product decomposition temperature of about 155 degrees centigrade, the decomposition and thus the gas release is slow. Additionally OBSH has the disadvantage that the decomposition products and the foamed end article produced have an unintended brownish discoloration at typical processing temperatures which are higher than 180 degrees centigrade The carbonates such as sodium bicarbonate do not liberate nitrogen but carbon dioxide and possibly water upon decomposition. Typically for carbon dioxide is its high solubility in the polymer, but it permeates out of the polymer matrix more rapidly than nitrogen, making it less efficient as a foaming agent.

The carbonates are generally not useful for the production of soft foams with a fine and uniform cell structure with little shrink. Sodium bicarbonate, the most common representative of the carbonates used as chemical blowing agents, is known to have a slow decomposition and release of gas, which occurs over a wider temperature range in comparison to both ADCA and OBSH. The decomposition temperature of sodium bicarbonate can be influenced by citric acid.

Alkali metal bicarbonate particles, such as sodium bicarbonate particles and potassium bicarbonate particles, are known in the art. These products have many properties which make them interesting and extensively used in several technical fields, such as pharmaceutical industry, the feed and food industry, in detergents and in the treatment of non-ferrous metals.

The most common way to manufacture bicarbonate particles is crystallization by carbonization with carbon dioxide of a solution of the corresponding alkali metal (sodium or potassium carbonate for example) or a solution of the hydroxide of the corresponding alkali metal. It is also common to crystallize bicarbonates by controlled cooling of bicarbonate solutions, or by evaporating the solvent of such solutions.

The non-azodicarbonamide blowing agents fail to meet the expected requirement profile of a good blowing agent for foamed crosslinked polymers, and are in need of improvement in this respect.

SUMMARY

An aspect of the present invention provides a foamable polymer composition comprising a crosslinkable polymer, a crosslinking agent, and a chemical blowing agent which comprises a functionalized particulate bicarbonate, which can be used advantageously as a non-azodicarbonamide blowing agent, particularly for the preparation of a foamed crosslinked polymer material, such as foamed EVA and crosslinked polyolefins.

The foamable polymer composition is preferably thermally expandable.

The crosslinking agent in the foamable polymer composition preferably comprises a crosslinking peroxide compound. The crosslinking peroxide compound is preferably an organic peroxide. The crosslinking peroxide compound may be selected from dicumyl peroxide or bis(tert-butyldioxyisopropyl)benzene.

In particular, the foamable polymer composition comprises:
  a crosslinkable polymer, selected from the group consisting of polyolefins (PO), a polyolefin elastomers (POE), polyolefin block co-polymers (OBC), ethylene vinyl acetate copolymers (EVA), EVA/PO copolymers, EVA/OBC copolymers, and combinations thereof such as preferably selected from the group consisting of polyethylenes, polypropylenes, ethylene vinyl acetate copolymers, ethylene/alpha-olefin block co-polymers and combinations thereof
  a crosslinking peroxide agent and
  a chemical blowing agent comprising a functionalized particulate bicarbonate, wherein said functionalized particulate bicarbonate comprises an additive containing at least one fatty acid, rosin acid, any derivatives thereof, any salt thereof, or combination thereof.

The additive in the functionalized particulate bicarbonate may comprise or consist of a rosin acid or derivatives thereof, said rosin acid or derivatives thereof comprising abietic acid, dihydroabietic acid, and/or neoabietic acid, a fatty acid such as linoleic acid, lauric acid, oleic acid, linolenic acid, and/or stearic acid, any derivative thereof such as any ester, any salt thereof, or any combinations thereof, preferably comprises a rosin acid or derivatives thereof comprising abietic acid and/or dihydroabietic acid, linoleic acid, any derivative thereof, any salt thereof, or any combinations thereof.

The additive in the functionalized particulate bicarbonate may comprise or consist of a fatty acid, a rosin acid, any derivatives thereof, salts thereof, or any combinations thereof.

The additive in the functionalized particulate bicarbonate may comprise or consist of:
  a rosin acid or any derivative thereof which comprises abietic acid, dihydroabietic acid, and/or neoabietic acid, any ester, any salt thereof, or any combinations thereof, preferably which comprises abietic acid and/or dihydroabietic acid, any ester, any salt thereof, or any combinations thereof.

The rosin acid additive in the functionalized particulate bicarbonate preferably comprises abietic acid, dihydroabietic acid, neoabietic acid, a rosin acid ester, or mixtures thereof, more preferably comprises abietic acid, dihydroabietic acid, or mixtures thereof.

When the additive in the functionalized particulate bicarbonate comprises or consist of a fatty acid, the fatty acid may be selected from the group consisting of linoleic acid, palmitoleic acid, oleic acid, linolenic acid, arachidonic acid, lauric acid, stearic acid, and any combination of two or more thereof; preferably a fatty acid selected from the group consisting of linoleic acid, oleic acid, lauric acid, any derivative thereof such as any ester, any salt thereof, and any combinations thereof.

In some embodiments, the additive in the functionalized particulate bicarbonate may exclude stearic acid or a stearate salt.

In some embodiments, the additive in the functionalized particulate bicarbonate may include a fatty acid other than stearic acid.

In some embodiments, the additive in the functionalized particulate bicarbonate may include a fatty acid salt other than a stearate salt.

The additive in the functionalized particulate bicarbonate may comprise or consist of an unsaturated fatty acid.

In preferred embodiments, the additive in the functionalized particulate bicarbonate preferably comprises or essentially consists of:
  a rosin acid or any derivative thereof which comprises abietic acid and/or dihydroabietic acid,
  linoleic acid, any derivative thereof, any salt thereof, or any combination thereof.

The functionalized particulate bicarbonate may further comprise a second additive which liberates $CO_2$ upon heating, and wherein said second $CO_2$-liberating compound preferably is at least one of:
fumaric acid,
tartaric acid,
citric acid, citrates (such as sodium hydrogen citrate, disodium citrate), or esters of citric acid; or combination thereof.

In some embodiments, the additive in the functionalized particulate bicarbonate may exclude citric acid or a citrate salt.

In preferred embodiments, the chemical blowing agent does not contain an exothermic blowing agent, or wherein the chemical blowing agent does not contain a compound which liberates nitrogen or ammonia gas during heating.

In alternate embodiments, the chemical blowing agent further comprises an exothermic blowing agent, preferably selected from the group consisting of ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), and TSH (toluene-4-sulfonohydrazide), 5-PT (5-phenyltetrazole), more preferably comprising ADCA.

The functionalized particulate bicarbonate may comprises at least 50% by weight and less than 100% by weight of the bicarbonate component, and from 50% to 0.02% by weight of at least one of said additive.

The functionalized particulate bicarbonate may comprise at least 65% by weight and less than 100% by weight of the bicarbonate component, and from 35% to 0.02% by weight of at least one of said additive.

The functionalized particulate bicarbonate may comprise at least 75% by weight and less than 100% by weight of the bicarbonate component, and from 25% to 0.02% by weight of at least one of said additive. In preferred embodiments, the functionalized particulate bicarbonate may comprise at least 90% by weight and less than 100% by weight of the bicarbonate component, and from 10% to 0.02% by weight of at least one of said additive.

In preferred embodiments, the functionalized particulate bicarbonate is obtained by grinding, extrusion, and/or spray coating bicarbonate particles with the additive(s), preferably by grinding and/or extrusion bicarbonate particles with the additive(s); optionally followed by subjecting the thus obtained functionalized particulate bicarbonate to milling to reduce its mean particle size.

In preferred embodiments, the foamable polymer excludes an exothermic blowing agent activator, such as an ADCA kicker containing zinc, preferably excludes ZnO. In preferred embodiments, the functionalized particulate bicarbonate further comprises silica, preferably comprises amorphous silica, more preferably comprises amorphous precipitated silica.

In preferred embodiments, the functionalized particulate bicarbonate is characterized by a TGA (thermogravimetric analysis) maximum loss temperature or a DSC (Differential Scanning Calorimetry) maximum peak temperature of at least 145° C., preferably of at least 150° C.

In preferred embodiments, the functionalized particulate bicarbonate is characterized by a TGA maximum loss temperature or a DSC maximum peak temperature at least 5° C. greater, preferably at least 10° C. greater, than a nonfunctionalized particulate bicarbonate.

In preferred embodiments, the functionalized particulate bicarbonate is characterized by a TGA maximum loss temperature or a DSC maximum peak temperature at least 5° C. greater, preferably at least 10° C. greater, than a mixture of a nonfunctionalized particulate sodium bicarbonate and citric acid or a citrate salt.

In preferred embodiments, the functionalized particulate bicarbonate may be characterized by a single decomposition peak in thermogravimetric analysis (TGA) or Differential Scanning Calorimetry (DSC) analysis.

As used herein, the TGA maximum weight loss temperature is the temperature at which the sample weight is decomposed. The DSC maximum peak temperature represents the maximum rate of phase transformation.

In preferred embodiments, the functionalized sodium bicarbonate has an activation temperature which is lower than azodicarbonamide (ADCA). The activation temperature of the functionalized sodium bicarbonate is preferably determined by TGA or DSC analysis. This may allow the reduction of the heating temperature or an improvement of cycle time (e.g., reduction) under certain conditions.

In other embodiments, the functionalized sodium bicarbonate has an activation temperature which is greater than a mixture of a not-functionalized particulate sodium bicarbonate and citric acid or a citrate salt.

The crosslinking peroxide agent in the foamable polymer composition is an organic peroxide, preferably dicumyl peroxide or bis(tert-butyldioxyisopropyl)benzene.

In preferred embodiments, the foamable polymer composition comprises from 1.5% to 6% by weight of the functionalized particulate bicarbonate.

Another aspect of the present invention relates to the use of the foamable polymer composition comprising the functionalized particulate bicarbonate as chemical blowing agent for foaming a crosslinkable polymer.

One advantage of the present invention is to provide an easy to implement and a cost-competitive alternative to ADCA or other existing foaming agents for the foaming of crosslinkable polymers such as EVA or XLPO.

Yet another advantage of the present invention is the improvement of workers' safety conditions regarding exposure to hazardous chemicals, as the functionalized particulate bicarbonate which releases $CO_2$ replaces the ADCA blowing agent which releases ammonia.

Yet another advantage of the present invention is to provide an environmentally-friendly solution ahead of upcoming regulations which provides for reduced use or phasing out of ADCA as blowing agent.

Another aspect relates to a process for manufacturing a foamed crosslinked polymer, preferably wherein the foamed crosslinked polymer is selected from the group consisting of EVA, POE, crosslinked polyolefins (XLPO), a crosslinked polyolefin block co-polymers (OBC), a EVA/PO copolymers, and EVA/OBC copolymers, more preferably selected from the group consisting of EVA, crosslinked polyolefins (XLPO), and crosslinked EVA/PO copolymers, the process comprising
heating the foamable polymer composition according to any of Claims 1 to 12 which comprises the functionalized particulate bicarbonate, in a mold at a temperature suitable for liberating $CO_2$ gas, melting and crosslinking the crosslinkable polymer with sais crosslinking peroxide agent to form a crosslinked polymer during a predetermined time from 4 minutes to 10 minutes,
preferably from 4 to 7 minutes, preferably wherein said temperature is at or above glass transition temperature Tg and/or above melting temperature Tm of the crosslinkable polymer; and opening the mold resulting in expanding the crosslinked polymer to form a foamed crosslinked polymer, preferably wherein the predetermined time with the foamable polymer composition comprising the functionalized bicarbonate is less than that with a foamable polymer composition containing the same polymer, the same crosslinking compound but with ADCA with an ADCA kicker such as ZnO to obtain a foamed polymer.

The process may further comprise cryo-milling or calendaring the foamable polymer composition prior to heating, wherein said heating the foamable polymer composition is carried out at a temperature from about 180° C. to 190° C., for a predetermined time from 4 minutes to 10 minutes, preferably from 4 to 7 minutes, either in a furnace of an injection molder before injecting the foamable composition into the mold for injection molding or in the mold for compression molding; and wherein after said heating, opening the mold causes expansion of the crosslinked polymer.

The process may further comprise cooling the foamed crosslinked polymer, preferably to room temperature without applying any cooling device or cooling method.

An embodiment relates to a foamed crosslinked polymer obtained by such process, wherein the foamed crosslinked polymer is selected from the group consisting of EVA, crosslinked polyolefins (XLPO), crosslinked polyolefin block co-polymers (OBC), EVA/PO copolymers, and EVA/OBC copolymers, preferably selected from the group consisting of EVA, crosslinked polyolefins (XLPO), and crosslinked EVA/PO copolymers.

Particular embodiments of the present invention are as follows.

The functionalized particulate bicarbonate in the foamable polymer composition is preferably a particulate sodium bicarbonate which is functionalized with at least one additive. This functionalized particulate sodium bicarbonate shows improved properties of expansion in comparison with non-functionalized particulate sodium bicarbonate of equivalent size. A "non-functionalized particulate sodium bicarbonate" is defined as a particulate sodium bicarbonate made without the additive(s) used in the making of the functionalized particulate sodium bicarbonate. The functionalized particulate sodium bicarbonate in the foamable polymer composition may reduce the foaming time at a temperature above glass transition temperature Tg and/or above melting temperature Tm of the polymer.

During foaming of polymer when particles of non-functionalized sodium bicarbonate are used as foaming agent, it was observed that the gas release occurs earlier than expected, due to the quick decomposition of bicarbonate. It has been found that functionalizing the bicarbonate particles by coating, by granulation, and/or by encapsulating with specific additives enhances the protection of the bicarbonate particles with an inactive barrier, which delays the thermal decomposition when having various bicarbonate particle sizes, small (some may be nano-sized) and large (some may be micron-sized).

The functionalized particulate bicarbonate acts as a chemical blowing agent in the foamable polymer composition suitable for foaming a crosslinkable polymer to form a crosslinked foamed polymer, for example EVA and crosslinked polyolefins.

In a preferred embodiment, the chemical blowing agent comprising the functionalized particulate bicarbonate is endothermic.

In a preferred embodiment, the chemical blowing agent comprising the functionalized particulate bicarbonate does not contain a blowing agent which is exothermic.

In a preferred embodiment, the chemical blowing agent comprising the functionalized particulate bicarbonate does not contain a blowing agent which would liberate nitrogen gas and/or ammonia during heating when a foamed polymer is made using such chemical blowing agent.

In preferred embodiments, the chemical blowing agent consists essentially of the functionalized particulate sodium bicarbonate.

In some embodiments, the additive in the functionalized particulate bicarbonate may exclude citric acid or a citrate salt.

In other embodiments, the chemical blowing agent may further comprise a second compound which liberates $CO_2$ upon heating, said second compound being selected from the group consisting of a carboxylic or polycarboxylic acid, derivative thereof (such as esters), or salts thereof. The second compound may comprise or may be at least one of:

fumaric acid, tartaric acid, citric acid, citrates (such as sodium hydrogen citrate, disodium citrate), or esters of citric acid; or combination thereof.

The second compound may be functionalized with at least one additive which is different or the same as the one used in the functionalized particulate bicarbonate.

In some embodiments, the foamable polymer composition comprises the functionalized particulate bicarbonate as a first endothermic blowing agent and a carboxylic or polycarboxylic acid, ester thereof, or salt thereof, as a second endothermic blowing agent. The carboxylic or polycarboxylic acid, ester thereof, or salt thereof may be also functionalized. The functionalized particulate bicarbonate and the functionalized carboxylic or polycarboxylic acid, ester thereof, or salt thereof may be functionalized together or separately.

In particular embodiments, the foamable polymer composition does not contain a blowing agent which would liberate nitrogen gas and/or ammonia during heating when a foamed polymer is made from such foamable composition.

In some embodiments, the foamable polymer composition does not contain an exothermic blowing agent.

In alternate embodiments, the foamable polymer composition contains an exothermic blowing agent in addition to the functionalized bicarbonate. The exothermic blowing agent is preferably selected from the group consisting of ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), and TSH (toluene-4-sulfonohydrazide), 5-PT (5-phenyltetrazole), more preferably ADCA The functionalized sodium bicarbonate particles are produced in the presence of at least one additive from a solution containing sodium bicarbonate or directly from solid sodium bicarbonate particles. Suitable additives in the functionalized particulate bicarbonate are provided herein in the description.

In some embodiments, the functionalized particulate bicarbonate may be spray-dried bicarbonate particles in the presence of said additive, or co-milled bicarbonate particles in the presence of said additive, or coated with the additive in a fluid bed, or granulated with the additive in a fluid bed, or coated with the additive in an extruding device.

In preferred embodiments, the functionalized particulate bicarbonate can be obtained by at least one of the following processes:
- by grinding or co-grinding (also known as milling or co-milling) with the additive(s) in emulsion or powder form;
- by spray coating and granulation within a fluidized bed, and/or
- by extrusion, including simultaneous mixing/extrusion.

In more preferred embodiments, the functionalized particulate bicarbonate can be obtained by at least one of the following processes:
- by grinding or co-grinding (also known as milling or co-milling) with the additive(s) in emulsion or powder form;
- and/or
- by extrusion, including simultaneous mixing/extrusion.

The functionalized particulate bicarbonate which is obtained by at least one said process may be further subjected to milling to reduce its mean particle size.

The process for functionalizing the particulate bicarbonate with any additional additive may be the same or different as the process used for functionalizing the same particulate bicarbonate with the additive selected from the group consisting of a fatty acid, a rosin acid, any derivatives thereof, salts thereof, and any combinations thereof.

DETAILED DESCRIPTION

Definitions

Figure 1:
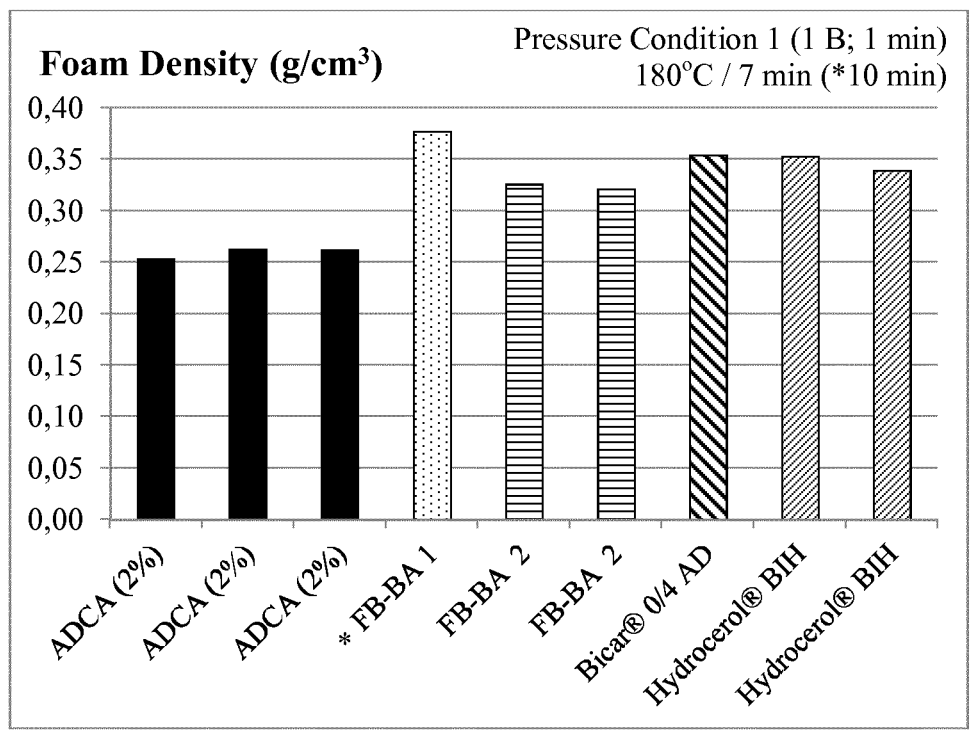
FIG. 1 and FIG. 2 provide the foam density and the volumetric expansion ratio, respectively, of the EVA foams in injection molding using different functionalized bicarbonate samples, ADCA, and commercial sodium bicarbonate products as blowing agents.

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

Further, it should be understood that elements and/or features of an apparatus, a process or method described herein can be combined in a variety of ways without departing from the scope and disclosures of the present teachings, whether explicit or implicit herein.

The term "thermoplastic material" shall mean a polymer that becomes pliable or moldable above a specific temperature, so is capable of flow at high temperatures below the thermal decomposition temperature and returns to a solid state upon cooling. A polymer is a macromolecular compound prepared by reacting (i.e. polymerizing, condensation) monomers of the same or different type, including homo- and copolymers. Thermoplastic materials are made by chain polymerization, polyaddition and/or polycondensation.

The term "functionalized particulate bicarbonate" is to be understood as defining particles which comprise a bicarbonate and an additive, preferably within the same particle. For example, the additive may form a layer or coating on the bicarbonate or the bicarbonate may form a layer or coating on the additive. Alternatively or additionally the additive may be embedded within a matrix of the bicarbonate or vice versa. The particle comprising bicarbonate and additive may be an agglomeration of smaller particles or small particles of one of the components may be agglomerated to a larger particle (or larger particles) of the other component. Preferably, the term "functionalized particulate bicarbonate" does not include a mere mixture of bicarbonate particles and at least one additive whether it be in liquid form or in the form of particles.

The term "functionalizing additive", as used herein, refers to a compound that is capable of improving at least one $CO_2$ release property of sodium bicarbonate when the additive is formulated with the sodium bicarbonate, relative to the sodium bicarbonate alone (without additive). For example, the functionalizing additive is capable of increasing the $CO_2$ release beginning temperature and/or the $CO_2$ release maximum temperature of the functionalized particulate bicarbonate, determined in accordance with Example 54 of the present application.

The term "comprising" includes "consisting essentially of" and "consisting of".

As used herein, 'EVA' means an ethylene/vinyl acetate copolymer; 'PO' means a polyolefin; 'XLPO' means a crosslinked polyolefin; 'POE' means a polyolefin elastomer; 'OBC' means a crosslinked polyolefin block copolymer. An EVA/PO copolymer represents an ethylene/vinyl acetate and polyolefin copolymer, and 'EVA/OBC copolymer' represents an ethylene/vinyl acetate and crosslinked polyolefin block copolymer.

The term "foamed" in connection with the terms "thermoplastic material", "polymer", "EVA", "XLPO", "OBC" or copolymer shall mean such material, polymer, EVA, XLPO, OBC or copolymer with a cellular structure which is formed by gas generation from thermal decomposition and/or chemical reaction of a chemical blowing agent during processing.

The term "ppm" means parts per million, expressed by weight (e.g., 1 ppm=1 mg/kg).

The sign "%" or "wt %" refers to "weight percent" unless specifically stated otherwise.

The term "powder" shall mean a compound consisting of milled (ground), extruded, or spray-dried solid particles.

The term "exothermic blowing agent" defines a chemical that generates heat during its decomposition. An exothermic blowing agent typically undergoes rapid decomposition in a narrow temperature range. Generally speaking, the exothermic chemical blowing agents are associated as those chemicals giving $N_2$ as the main blowing gas (>50 vol % of the generated gas is $N_2$). Other minor gases though may evolve from the decomposition of the exothermic chemical blowing agent. These other minor gases may include carbon monoxide, also in small amounts (<5 vol %) of ammonia, and/or $CO_2$.

The term "endothermic blowing agent" defines a chemical that absorbs heat during its decomposition. An endothermic blowing agent typically has broader decomposition ranges in terms of both temperature and time. Most endothermic chemical blowing agents generate $CO_2$ as the main blowing gas (>50 vol % of the generated gas is $CO_2$).

The $CO_2$ release properties of the functionalized particulate bicarbonate can be determined by performing a thermogravimetric analysis (TGA) of a functionalized particulate bicarbonate sample, measuring the weight loss of the sample in dependence of the temperature. The $CO_2$ release properties are characterized by the derivate value for weight loss depending on the temperature. The $CO_2$ release beginning temperature is the temperature where the derivate value for weight loss starts to raise. The $CO_2$ release maximum temperature is the temperature where the derivate value for weight loss is at maximum. Typically, heating is performed between 30° C. and 250° C. at a speed of 10° C./min. Thermogravimetric analysis can be performed for example on an STD Q600 V20.9 Build 20 thermogravimetric analysis instrument (provided by TA Instruments).

A plurality of elements includes two or more elements.

The phrase 'A and/or B' refers to the following selections: element A; or element B; or combination of elements A and B (A+B). The phrase 'A and/or B' is equivalent to at least one of A and B. The phrase 'A and/or B' equates to at least one of A and B.

The phrase 'A1, A2, . . . and/or An' with n≥3 includes the following choices: any single element Ai (i=1, 2, . . . n); or any sub-combinations of from two to (n−1) elements chosen from A1, A2, . . . , An; or combination of all elements Ai (i=1, 2, . . . n). For example, the phrase 'A1, A2, and/or A3' refers to the following choices: A1; A2; A3; A1+A2; A1+A3; A2+A3; or A1+A2+A3.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for illustration purpose, when it is stated that "the element X is generally at least 10, advantageously at least 15", the present description also includes another embodiment where a new minimum can be selected between 10 and 15, for example: where "the element X is at least 11", or also where: "the element X is at least 13.74", etc.; 11 or 13.74 being values included between 10 and 15. Also for illustration purpose, when it is indicated that "the element X is generally at most 15, advantageously at most 10", the present description also includes another embodiment where a new maximum can be selected between 10 and 15.

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

For example, when in an embodiment the choice of an element from a group of elements is described, the following embodiments are also explicitly described:

the choice of two or more elements from the group,
the choice of an element from a subgroup of elements consisting of the group of elements from which one or more elements have been removed.

The use of the singular 'a' or 'one' herein includes the plural unless specifically stated otherwise.

In addition, if the term "about" or "ca." is used before a quantitative value, the present teachings also include the specific quantitative value itself, unless specifically stated otherwise. As used herein, the term "about" or "ca." refers to a +−10% variation from the nominal value unless specifically stated otherwise.

An aspect of the present invention provides a foamable polymer composition comprising a crosslinkable polymer, a crosslinking agent, and a chemical blowing agent which comprises a functionalized particulate bicarbonate, which can be used advantageously as a non-azodicarbonamide blowing agent, particularly for the preparation of a foamed crosslinked polymer material, such as foamed EVA and crosslinked polyolefins.

The foamable polymer composition is preferably thermally expandable.

The crosslinking agent in the foamable polymer composition preferably comprises a crosslinking peroxide compound. The crosslinking peroxide compound is preferably an organic peroxide. The crosslinking peroxide compound may be selected from dicumyl peroxide or bis(tert-butyldioxyisopropyl)benzene.

The crosslinkable polymers may be selected from the group consisting of polyolefins (PO), polyolefin elastomers (POE), polyolefin block co-polymers (OBC), ethylene vinyl acetate copolymers (EVA), or combinations thereof such as EVA/PO copolymers, preferably polyethylenes, polypropylenes, ethylene vinyl acetate copolymers, ethylene/alpha-olefin block copolymers or combinations thereof.

A particular embodiment relates to a foamable polymer composition comprising
a) a crosslinkable polymer;
b) a crosslinking peroxide compound; and
c) a chemical blowing agent comprising a functionalized particulate bicarbonate.

The amount of the crosslinkable polymer in the foamable polymer composition typically ranges between about 20 wt % and about 90 wt % based on the total weight of the foamable polymer composition.

The amount of the crosslinking peroxide compound can be selected according to the desired final characteristic of the foamable polymer composition, generally more than 0% and up to 6 wt %, or preferably from about 0.5 wt % to about 4 wt % based on the total weight of the foamable polymer composition.

The amount of the functionalized particulate bicarbonate in the foamable polymer composition typically ranges from 1.5 wt % to 6 wt %, preferably from 3 wt % to 6 wt %, more preferably from 3.5 wt % to 5.5 wt % of the foamable polymer composition.

The foamable polymer composition of the present invention may contain further components, for instance, foam stabilizers; air release agents; fillers or extenders (e.g., $CaCO_3$ as a filler), such as carbon black; other polymers and oils; curing agents, such as sulfur compounds and various chemicals that act as a part of a curing system, such as zinc oxide; antistatic agents; biocides; colorants; coupling agents; fibrous reinforcements; flame retardants; fungicides; heat stabilizers; lubricants; mold release agents; plasticizers (e.g., DINP=di-isononyl phtalate); preservatives; processing aids; slip agents; ultraviolet stabilizers; viscosity depressants; dyes; or any other ingredient that may be a desirable component of the resulting foamed polymer.

In some embodiments, the foamable composition does not contain another blowing agent other than the functionalized particulate bicarbonate.

In other embodiments, the foamable composition does not contain any blowing agent which is exothermic.

In particular embodiments, the foamable composition does not contain a blowing agent which liberates nitrogen gas and/or ammonia. Examples of blowing agents which liberate nitrogen gas are exothermic blowing agents such as azodicarbonic acid diamide (azodicarbonamide, ADC, ADCA, CAS No. 123-77-3), the sulfonhydrazides: 4,4'-oxybis(benzenesulfonylhydrazide) (OBSH, CAS No. 80-51-3) and p-toluenesulfonylhydrazide, (TSH, CAS No. 1576-35-8).

In preferred embodiments, the foamable polymer composition does not contain azodicarbonamide.

In alternate or additional preferred embodiments, the foamable polymer composition does not contain benzenesulfonylhydrazide.

In alternate or additional embodiments, the foamable polymer composition does not contain p-toluenesulfonylhydrazide.

In yet alternate embodiments, the foamable polymer composition may further comprise an exothermic chemical blowing agent, preferably selected from the group consisting of ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), and TSH (toluene-4-sulfonohydrazide), 5-PT (5-phenyltetrazole), more preferably may further comprise ADCA (azodicarbonamide). In such embodiments, the foamable polymer composition may comprise a weight ratio of the functionalized bicarbonate to the exothermic chemical blowing agent from 5:95 to 95:5, preferably 90:10 to 10:90, more preferably 85:15 to 15:85, yet more preferably 80:20 to 20:80.

A functionalized particulate bicarbonate is included as an ingredient in the foamable polymer composition. The functionalized particulate bicarbonate is used either as the sole chemical blowing agent in the foamable polymer composition or as a component of a chemical blowing agent used in the foamable polymer composition.

The functionalized particulate bicarbonate is preferably used as a blowing agent at the same time as a crosslinking agent for making a foamed crosslinked polymer, preferably used as an endothermic blowing agent.

Non-limiting examples of foamed crosslinked polymers are selected from the group consisting of crosslinked polyolefins (PO), polyolefin elastomers (POE), polyolefin block co-polymers (OBC), ethylene vinyl acetate copolymers (EVA), or combinations thereof such as EVA/PO copolymers, preferably polyethylenes, polypropylenes, ethylene vinyl acetate copolymers, ethylene/alpha-olefin block co-polymers or combinations thereof.

The foamable polymer composition may optionally comprise a functionalized particulate second compound used as supplemental chemical blowing agent for foaming (as described herein).

The foamable polymer composition may optionally comprise a foam stabilizer.

The amount of the polymer in the foamable polymer composition typically ranges between about 70 wt % (or 20 wt %) and about 99 wt % based on the total weight of the foamable polymer composition. The amount of polymer can be selected according to the desired final characteristic of the foamable polymer composition.

For example, an EVA foamable composition may contain from 70 to 95 wt % of EVA co-polymer, from 0.5 wt % to 4 wt % of the crosslinking peroxide compound, from 1.5 wt % to 6 wt % of the functionalized particulate bicarbonate, and optionally up to 6 wt % of other component(s).

For example, a crosslinkable polyolefin foamable composition may contain from 85 to 96 wt %, preferably from 90 wt % to 95 wt %, of the crosslinkable polyolefin, up to 6 wt % of the crosslinking peroxide compound, from 1.5 wt % to 6 wt % of the functionalized particulate bicarbonate, and optionally up to 6 wt % of other component(s).

The other component(s) may be selected from foam stabilizers; air release agents; fillers or extenders (e.g., $CaCO_3$ as a filler), such as carbon black; other polymers and oils; curing agents, such as sulfur compounds and various chemicals that act as a part of a curing system, such as zinc oxide; antistatic agents; biocides; colorants; coupling agents; fibrous reinforcements; flame retardants; fungicides; heat stabilizers; lubricants; mold release agents; plasticizers (e.g., DINP=di-isononyl phtalate); preservatives; processing aids; slip agents; ultraviolet stabilizers; viscosity depressants; dyes; or any other ingredient that may be a desirable component of the resulting foamed polymer.

The functionalized particulate bicarbonate comprises a bicarbonate ingredient which preferably is an alkali or ammonium salt, such as sodium bicarbonate, potassium bicarbonate, and ammonium bicarbonate. Sodium and potassium bicarbonate, in particular sodium bicarbonate are preferred.

In some embodiments, the functionalized particulate bicarbonate preferably comprises at least 50% by weight, or at least 55% by weight, or at least 60% by weight, or even at least 65% by weight, but less than 100% by weight of the bicarbonate ingredient (e.g., ammonium, sodium or potassium bicarbonate).

In some embodiments, the functionalized particulate bicarbonate may comprise at least 90% by weight, or at least 93% by weight, or at least 94% by weight, or even at least 95% by weight, but less than 100% by weight of the bicarbonate ingredient (e.g., ammonium, sodium or potassium bicarbonate).

In some particular embodiments, the functionalized particulate bicarbonate preferably comprises at least 90% by weight but less than 100% by weight of an alkali metal bicarbonate. The functionalized particulate bicarbonate preferably comprises at least 92% by weight of an alkali metal bicarbonate, at least 93% by weight, more preferably at least 94% by weight, in particular at least 95% by weight of the alkali metal bicarbonate, in particular sodium bicarbonate.

In some embodiments, the functionalized particulate bicarbonate may have 50% by weight or less, or 45% by weight or less, or 40% by weight or less, or even 35% by weight or less, of at least one additive.

In some particular embodiments, the functionalized particulate bicarbonate contains 10% by weight or less, or 7% by weight or less, or 5% by weight or less, or 3% by weight or less, of the additive.

The additive should be present in the functionalized particulate bicarbonate in the amount of at least 0.02% by weight, preferably at least 0.05% by weight, in particular at least 0.1% by weight. The higher the weight % of the additive in the functionalized particulate bicarbonate, the more disadvantageous it will be for cost reasons. Preferably, to reduce cost of the more expensive additive compared to the bicarbonate ingredient, it is desirable to use at most 10% by weight, more preferably at most 8% by weight, in particular at most 5% by weight of the additive in the functionalized particulate bicarbonate.

However in embodiments where the additive is relatively not expensive (for example when its cost is not more than twice that of the bicarbonate ingredient), it may be desirable to use at least 5% by weight, more preferably at least 7% by weight, in particular at least 10% by weight of the additive and/or at most 50% by weight, more preferably at most 40% by weight, yet more preferably at most 35% by weight in the functionalized particulate bicarbonate.

In some particular embodiments, the functionalized particulate bicarbonate may comprise at least 0.02 by weight of at least one additive and at most 50%, or at most 45%, or at most 40%, or at most 35%, by weight of at least one additive.

In some particular embodiments, the functionalized particulate bicarbonate may comprise more than 10% and up to 50% by weight of at least one additive.

In some embodiments, for cost effectiveness, the functionalized particulate bicarbonate may comprise from 0.02% to 10% by weight of the additive.

In particular embodiments, the functionalized particulate bicarbonate may comprise at least 65% by weight and less than 100% by weight of the bicarbonate component, and from 35% to 0.02% by weight of at least one additive; or may comprise at least 75% by weight and less than 100% by weight of the bicarbonate component, and from 25% to 0.02% by weight of at least one additive.

The functionalized particulate bicarbonate may contain an additive which is capable of liberating $CO_2$ and which is also used for functionalizing the particulate bicarbonate. This $CO_2$-liberating additive may be considered as a secondary blowing agent in the functionalized particulate bicarbonate.

Not only this $CO_2$-liberating additive would provide an increase in the $CO_2$ generation when the functionalized particulate bicarbonate is used as an endothermic blowing agent, but also this additive would prevent premature $CO_2$ release from the bicarbonate core by protecting its surface (or part thereof). This $CO_2$-liberating additive may be a carboxylic or polycarboxylic acid, derivative thereof (such as esters), or salts thereof.

Suitable carboxylic acids include those of the formula: HOOC—R—COOH where R is an alkylene group of 1 to about 8 carbon atoms which may also be substituted by one or more hydroxy groups or keto groups and may also contain unsaturation. Also included are esters, salts and half salts.

A preferred $CO_2$-liberating additive may include at least one of:
 fumaric acid,
 tartaric acid, or
 citric acid, citrates (such as sodium hydrogen citrate, disodium citrate), or esters of citric acid.

Esters of citric acid may include tributyl citrate, triethyl citrate, tri-C12-13 alkyl citrate, tri-C14-15 alkyl citrate, tricaprylyl citrate, triethylhexyl citrate, triisocetyl citrate, trioctyldodecyl citrate and triisostearyl citrate, isodecyl citrate and stearyl citrate, dilauryl citrate, and/or ethyl citrates (mixture of tri-, di- and monoesters), preferably tributyl citrate, triethyl citrate, isodecyl citrate, or triethylhexyl citrate.

A more preferred $CO_2$-liberating additive comprises or consists of citric acid, esters thereof, or salts thereof (such as citrates).

In some embodiments, the functionalized particulate bicarbonate includes citric acid, esters thereof, or salts thereof (such as citrates) as a second functionalization additive.

In preferred embodiments, the functionalized particulate bicarbonate does not include citric acid, esters thereof, or salts thereof (such as citrates) as a second functionalization additive.

In some embodiments, the chemical blowing agent comprising the functionalized particulate bicarbonate does not contain an exothermic blowing agent.

In some embodiments, the chemical blowing agent comprising the functionalized particulate bicarbonate further includes citric acid, esters thereof, or salts thereof (such as citrates).

In preferred embodiments, the chemical blowing agent comprising the functionalized particulate bicarbonate excludes citric acid, esters thereof, or salts thereof (such as citrates).

In some particular embodiments, the chemical blowing agent comprising the functionalized particulate bicarbonate does not contain a compound used as blowing agent which liberates ammonia.

In some particular embodiments, the chemical blowing agent comprising the functionalized particulate bicarbonate does not contain a compound used as blowing agent which liberates nitrogen gas. Examples of blowing agents which liberate nitrogen gas are exothermic blowing agents such as azodicarbonic acid diamide (azodicarbonamide, ADC, ADCA, CAS No. 123-77-3), the sulfonhydrazides 4,4'-oxybis(benzenesulfonylhydrazide) (OBSH, CAS No. 80-51-3) and p-toluenesulfonylhydrazide, (TSH, CAS No. 1576-35-8).

In preferred embodiments, the chemical blowing agent comprising the functionalized particulate bicarbonate does not contain azodicarbonamide.

In alternate or additional preferred embodiments, the chemical blowing agent comprising the functionalized particulate bicarbonate does not contain benzenesulfonylhydrazide.

In alternate or additional embodiments, the chemical blowing agent comprising the functionalized particulate bicarbonate does not contain p-toluenesulfonylhydrazide.

In preferred embodiments of the present invention, the chemical blowing agent comprising the functionalized particulate bicarbonate comprises the bicarbonate ingredient and the at least one additive in powder form.

For certain applications it is preferred that the functionalized particulate bicarbonate in the chemical blowing agent contains sodium bicarbonate as particles which are coated with a coating of at least one additive. Such coating can improve some properties of the functionalized particulate bicarbonate. The additive in such instance may be termed a "coating agent". The additive as coating agent shall mean that this additive is able to cover, partly or completely, the surface of particles of bicarbonate. The "coating agent" is a different compound than bicarbonate ingredient from which the core of the particles are made of.

For certain applications, it is envisioned that the functionalized particulate bicarbonate contains sodium bicarbonate co-milled with one additive. Such co-milling with the additive can improve some properties of the functionalized particulate bicarbonate.

For certain applications, the functionalized particulate bicarbonate contains sodium bicarbonate as particles which are functionalized with more than one additive. The functionalization of the sodium bicarbonate particles may be carried out simultaneously with the additives using one functionalization method, or may be carried out sequentially using one additive with one functionalization method and then another additive with the same or different functionalization method. For example, sodium bicarbonate particles may be first functionalized with a first additive, and then these first-functionalized particles are again functionalized with a second additive (the second additive having the same composition or a different composition as the first additive, preferably having a different composition). The methods used for subsequent functionalizations may be the same, but preferably are different. The (first and second) functionalization methods are preferably selected from the group consisting of extrusion, co-grinding, and spray coating. For example, the first functionalization method may comprise or consist of co-grinding or extrusion, and the second functionalization method may comprise or consist of extrusion, co-grinding, or spray coating. Preferably, the first functionalization method may comprise or consist of co-grinding, and the second functionalization method may comprise or consist of extrusion. At least one of the (first and second) functionalization additives is selected from the group consisting of rosin acid, any derivatives thereof, salts thereof, and any combinations thereof.

For certain applications, the functionalized particulate bicarbonate contains sodium bicarbonate as particles which are functionalized with one additive, but the additive is not added all at once, but added sequentially in several portions. For example, bicarbonate particles may be first functionalized with a first portion of the additive, and then these first-functionalized bicarbonate particles are again functionalized with a second portion of the same additive. The methods used for functionalization may be the same or may be different. For example, the (first and second) functionalization methods are preferably selected from the group consisting of extrusion, co-grinding, and spray coating. Preferably, the first functionalization method may comprise or consist of co-grinding, and the second functionalization method may comprise or consist of extrusion.

For certain applications, it may be preferred that the functionalized particulate bicarbonate contains sodium bicarbonate as particles which are coated with a coating of a first additive, and then these coated particles are co-milled with a second additive (the second additive having the same composition or a different composition as the first additive).

For certain applications, the production of a fine cellular foam, so to produce a certain small amount of gas at one place, might be desirable. In order to improve the cellular foam structure it can be suitable that the functionalized particulate bicarbonate has a characteristic particle size and particle size distribution. The $D_{50}$ term is designating the diameter for which 50% by weight of the particles have a diameter less than or equal to $D_{50}$ (weight average diameter). The $D_{10}$ term is designating the diameter for which 10% by weight of the particles have a diameter less than or equal to $D_{10}$. The $D_{90}$ term is designating the diameter for which 90% by weight of the particles have a diameter less or equal to $D_{90}$.

The functionalized particulate bicarbonate may have advantageous properties, such as a low particle size preferably with a low span. The span of the particle size distribution is as known in the art defined as the ratio $(D_{90}-D_{10})/D_{50}$. The span may range from about 1 to about 6, such as from about 1 to about 3. In one embodiment the span may be lower than 6, preferably lower than 4, more preferably lower than 3. In one embodiment the span may be higher than 1, preferably higher than 2. In another embodiment the span may be lower than 1.8, more preferably at most 1.7 in particular at most 1.6, e.g. at most 1.5.

Preferably, the particles of the functionalized particulate bicarbonate have a particle size distribution of $D_{50}$ of at most 250 µm, preferably at most 100 µm, more preferably at most 60 µm, yet more preferably at most 40 µm, or at most 30 µm, or at most 25 µm.

In some embodiments, the particles of the functionalized particulate bicarbonate have a particle size distribution of $D_{50}$ of more than 1 µm, preferably more than 2 µm, more preferably more than 5 µm, yet more preferably at least 8 µm. This functionalized particulate bicarbonate is termed "functionalized micron-sized bicarbonate".

In some embodiments, the particles of the functionalized particulate bicarbonate have a $D_{10}$ in the range of 1 µm-160 µm, preferably in the range of 1 µm-10 µm, more preferably in the range of 2 µm-10 µm, yet more preferably in the range of 4 µm-8 µm, in particular 5 µm-6 µm.

In some embodiments, the particles of the functionalized particulate bicarbonate have a $D_{90}$ in the range of from 20 µm to 450 µm, preferably from 30 µm to 200 µm, more preferably from 30 µm to 165 µm, in particular from 30 µm to 100 µm.

The weight-average diameter $D_{50}$, as well as $D_{10}$ and $D_{90}$ values can be measured by laser diffraction and scattering on a Malvern Mastersizer S particle size analyser using an He—Ne laser source having a wavelength of 632.8 nm and a diameter of 18 mm, a measurement cell equipped with a backscatter 300 mm lens (300 RF), and MS 17 liquid preparation unit, and an automatic solvent filtration kit ("ethanol kit") using ethanol saturated with bicarbonate (wet method).

In some embodiments, the particles of the functionalized particulate bicarbonate have a particle size distribution of $D_{50}$ of at most 1 µm, preferably less than 1 µm. This functionalized particulate bicarbonate is termed "functionalized nano-sized bicarbonate".

In the instance when the functionalized particulate bicarbonate is based on nano-sized bicarbonate particles, it is preferred that the bicarbonate nano-sized particles are formed before functionalization. Techniques such as wet grinding with a solvent, micronisation and dry nanogrinding would be effective. Use of mills such as tumbler ball mills, planetary ball mills (for example available from Retch) or jet mills (for example available from Alpine) is suitable for making nano-sized bicarbonate particles. Ball milling involves decomposition of bulk solid materials into nanoscale regimes using a mechanical force. The reduction of particle size by high energy ball milling is termed as mechanical milling. Since milling a powder of bicarbonate powder to nanosize level generates quite a lot of heat, it is recommended to cool during the milling. Additionally, to facilitate the milling to nanosize level, it may be recommended to use a lubricant.

Additionally, to prevent particles from re-agglomerating during milling or after exiting the mill, it may be recommended to use a surfactant. These nano-sized particles have strong tendency to agglomerate owing to having large specific surface area. Surfactants may play an important role to prevent this close contact of the nano-sized particles by providing steric barrier and reducing surface tension. The surfactant molecules form a thin organic layer around the newly formed surfaces to protect the exposed surface from cold wielding when they come into contact with another surface during the milling process or when they exit the mill. A suitable surfactant may include a polymer such as poly (acrylic acid, sodium salt), or a fatty acid or ester thereof, such as oleic acid, stearic acid, oleic acid or oleylamine, palmitic acid, mysteric acid, undecanoic acid, octanoic acid, and/or valeric acid.

Because the functionalization adds another compound (additive) to the nanosized bicarbonate core particles, it is recommended to select a technique for additive deposition/incorporation (techniques being described in more detail below) which would not significantly increase the size of the initial bicarbonate core particles. It would be preferred for example for the particulate bicarbonate initially having a D50 of 1 μm or less before functionalization to generate after functionalization a functionalized particulate bicarbonate still in the nanosized range with a D50 of at most 1 μm or less. It is though acceptable in some instances that the functionalized particulate bicarbonate starting from nano-sized bicarbonate core particles may reach a D50 of 2 μm or less after functionalization.

The functionalized particulate bicarbonate shows excellent $CO_2$ release properties. As determined by TGA analysis, the maximum loss temperature of the functionalized particulate bicarbonate is preferably higher than the non-functionalized bicarbonate without additive. The $CO_2$ release of the functionalized particulate bicarbonate typically has its maximum at a temperature of at least 130° C., preferably at a temperature of at least 135° C., more preferably at a temperature of at least 140° C., even more preferably at a temperature of at least 145° C., and particularly preferably at a temperature of at least 155° C. The TGA maximum loss temperature for functionalized particulate bicarbonate may range from 150° C. up to 200° C., preferably from 155° C. up to 190° C.

As determined by Differential Scanning Calorimetry (DSC) thermal analysis, the functionalized particulate bicarbonate preferably has the maximum peak temperature higher than the non-functionalized bicarbonate without additive. The DSC maximum peak temperature of the functionalized particulate bicarbonate may be at least 140° C., preferably at least 145° C., more preferably at least 150° C., even more preferably at a temperature of at least 155° C., and particularly preferably at a temperature of at least 160° C. The DSC maximum peak temperature for the functionalized particulate bicarbonate may range from 160° C. up to 200° C., preferably from 160° C. up to 190° C. The functionalized particulate bicarbonate comprises at least one additive.

The additive in the functionalized particulate bicarbonate may comprise or consist of a fatty acid, a rosin acid, any derivatives thereof, salts thereof, or any combinations thereof.

The additive in the functionalized particulate bicarbonate may comprise or consist of:

a rosin acid or any derivative thereof which comprises abietic acid, dihydroabietic acid, and/or neoabietic acid, any ester, any salt thereof, or any combinations thereof, preferably which comprises abietic acid and/or dihydroabietic acid, any ester, any salt thereof, or any combinations thereof.

"Abietic acid" is also designated as (abieta-7,13-dien-18-oic acid).

Suitable derivatives of rosin acid may consist of or comprise for example one or more rosin acid esters, such as $C_{1-25}$ alkyl esters of rosin, glycerol rosin esters, pentaerythritol rosin esters, or combinations thereof. Other suitable derivatives of rosin acid may comprise hydrogenated rosin acid, dimers of rosin acid, or even polymerized rosin. A preferred derivative of rosin acid may comprise dihydroabietic acid, preferably at least 50 wt % of dihydroabietic acid.

The rosin acid additive in the functionalized particulate bicarbonate preferably comprises abietic acid, dihydroabietic acid, neoabietic acid, a rosin acid ester, or mixtures thereof, more preferably comprises abietic acid, dihydroabietic acid, or mixtures thereof.

A preferred derivative of rosin acid may comprise dihydroabietic acid (CAS No. 1740-19-8) preferably at least 50 wt % of dihydroabietic acid. Resigral® 52 is a commercial product which contains at least 52 wt % of dihydroabietic acid; Resigral® 52 supplied by LES DERIVES RESINIQUES ET TERPENIQUES (DRT) in Dax, France is a disproportionated rosin modified by chemical reagents to improve its thermal stability by modifying the proportion of its different isomers.

Other commercial rosin acid-based products manufactured by DRT can be used as one or more sources for the rosin acid derivatives, such as:

water based rosin dispersions (DERMULSENE RE 1513=aqueous, solvent free dispersion based on stabilized rosin ester, whose solid content is about 56 wt %, DERMULSENE A 7510=stabilized and polymerized rosin dispersion), glycerol rosin esters (DERTOLINE G2L);

pentaerythritol rosin esters (DERTOLINE P2L=tall oil resin esterified with pentaerythritol; HYDROGRAL P=pentaerythritol ester of hydrogenated rosin);

dimeric rosin acid (POLYGRAL 95, POLYGRAL 115, POLYGRAL 140);

polymerized rosin acid (POLYGRAL); and/or hydrogenated rosin (HYDROGRAL).

Liquid rosin esters from DRT may be selected from GRANOLITE TEG=triethylene-glycol rosin ester; GRANOLITE M=methyl ester of rosin; and/or HYDROGRAL M=methyl ester of hydrogenated rosin.

The rosin derivatives may comprise or consist of a fortified rosin, that is, a rosin which has a reacted content of a minor amount but effective amount of an acidic compound containing the —COC═C— group as fortifying agent such as maleic anhydride, fumaric acid, acetylene dicarboxylic acid and the dehydration products of citric acid, converting at least some of the abietic acid and related compounds to tricarboxylic species.

Suitable salts of rosin acid are for example alkali metal and alkali earth metal salts, but other salts are suitable as well. A preferred salt is the sodium salt.

Rosin acid may also be used as additive in the form of mixtures comprising rosin acid, such as tall oil.

All preferred embodiments, such as preferred amounts of rosin acid additive in the functionalized particulate bicarbonate are those as described below with respect to the optional additional additives.

When the additive in the functionalized particulate bicarbonate comprises or consist of a fatty acid, the fatty acid may be selected from the group consisting of linoleic acid, palmitoleic acid, oleic acid, linolenic acid, arachidonic acid, lauric acid, stearic acid, and any combination of two or more thereof.

The additive in the functionalized particulate bicarbonate may comprise or consist of:
- a fatty acid such as linoleic acid, oleic acid, lauric acid, and/or stearic acid, any derivative thereof such as any ester, any salt thereof, or any combinations thereof, preferably a fatty acid such as linoleic acid, oleic acid, lauric acid, any derivative thereof such as any ester, any salt thereof, or any combinations thereof.

In some embodiments, the additive in the functionalized particulate bicarbonate may exclude stearic acid.

In some embodiments, the additive in the functionalized particulate bicarbonate may exclude a stearate salt.

In some embodiments, the additive in the functionalized particulate bicarbonate may include a fatty acid other than stearic acid.

In some embodiments, the additive in the functionalized particulate bicarbonate may include a fatty acid salt other than a stearate salt.

The additive in the functionalized particulate bicarbonate may comprise or consist of an unsaturated fatty acid.

In preferred embodiments, the additive in the functionalized particulate bicarbonate preferably comprises or essentially consists of:
- a rosin acid or any derivative thereof which comprises abietic acid and/or dihydroabietic acid,
- linoleic acid, any derivative thereof, any salt thereof, or any combinations thereof.

In some embodiments, the functionalized particulate bicarbonate may further comprise at least one additional functionalization additive (other than a fatty acid, a rosin acid, any derivatives thereof, salts thereof, or combinations thereof) selected from
- one or more polymers;
- one or more amino acids, any derivative thereof, and salts thereof;
- one or more inorganic salts;
- one or more oils;
- one or more fats;
- one or more resin acids, any derivative thereof, and salts thereof;
- one or more fatty acids, any derivative thereof, and salts thereof;
- a carboxylic or polycarboxylic acid, derivative thereof (such as esters), or salts thereof, (other than a fatty acid, a rosin acid, any derivatives thereof, salts thereof, or combinations thereof);
- one or more soaps;
- one or more waxes; or
- any combinations thereof;

preferably selected from at least one polymer which more preferably is selected from the group consisting of polyoxyalkylenes and derivatives thereof including polyethylene glycols, poly(meth)acrylates and derivatives thereof, polyvinylalcohol, polysaccharides and combinations thereof; and even more preferably from the group consisting of polyvinylalcohol and polyoxyalkylenes and derivatives thereof including polyethylene glycols.

In some embodiments, the additional functionalization additive may comprise or consist of a polymer selected from the group consisting of polyvinylalcohol, polyglycol, polysaccharide, poly(meth)acrylic acid, poly(acrylic acid co-maleic acid, polyethylenenimine, polyvinylpyrrolidone, N-2 (-Hydroxypropyl) methacrylamide, polyoxyalkylenes and derivatives thereof including polyethylene glycol, and combinations thereof.

In some embodiments, the additional functionalization additive may comprise or consist of a polysaccharide selected from the group consisting of hydrolyzed starch, carboxymethylcellulose, alginic acid and its salt, arabic gum, carrageenan; guar gum, locust bean gum, xantham gum and combinations thereof.

In some embodiments, the additional functionalization additive may comprise or consist of an amino acid, derivative thereof or salt thereof selected from the group consisting of casein, gelatin, glycine, proline, hydroxyproline, glutamic acid, alanine, arginine, aspartic acid, lysine, pectin, serine, leucine, valine, phenylalanine, threonine, isoleucine, hydroxylysine, methionine, histidine, tyrosine and combinations thereof.

In some embodiments, the additional functionalization additive may comprise or consist of an inorganic salt selected from the group consisting of silicates (e.g., sodium silicate), NaCl, KCl, MgCl2, sodium phosphate, borates, nitrates, nitrites, sulfates, sulfites and combinations thereof.

In some embodiments, the additional functionalization additive may comprise or consist of:
- an amino acid, derivative thereof, or salt thereof,
- a polysaccharide (such as hydrolyzed starch, gums, carboxymethylcellulose),
- a resin acid, derivative thereof, or salt thereof,
- a fatty-acid, derivative thereof (such as esters), or salt thereof,
- a carboxylic or polycarboxylic acid, derivative thereof (such as esters), or salts thereof; or
- any combination thereof.

In some embodiments, the additional functionalization additive (different than the primary functionalization additive selected from a fatty acid, a rosin acid, any derivatives thereof, salts thereof, or combinations thereof) may comprise or consist of:
- a polymer (such as polyoxyalkylenes and derivatives thereof including polyethylene glycols, poly(meth) acrylates and derivatives thereof, polyvinylalcohol and polysaccharides, including modified, in particular hydrolyzed starch, maltodextrin and gum arabic),
- an amino acid, derivative thereof, or salt thereof (such as leucine),
- an oil (such as epoxidized soy bean oil),
- a resin acid, derivatives thereof, or salt thereof (different than rosin acid if rosin acid is used as the primary additive), a different fatty acid, derivatives thereof, or salt thereof (such as stearic acid, lauric acid, linoleic acid and glycerol mono stearate), a wax (such as bees wax and carnauba wax), or, any combination thereof.

In some embodiments, the additional functionalization additive may comprise or consist of a compound which is capable of liberating $CO_2$ and which is also used for functionalizing the particulate bicarbonate. This additive may be considered as a secondary blowing agent in the functionalized particulate bicarbonate. Not only this additive would provide an increase in the $CO_2$ generation when the functionalized particulate bicarbonate is used as an endothermic blowing agent, but also this additive would protect the bicarbonate core from premature $CO_2$ release by protecting its surface (or part thereof). This $CO_2$-liberating additive may be a carboxylic or polycarboxylic acid, derivative thereof (such as esters), or salts thereof.

Suitable carboxylic acids include those of the formula: HOOC—R—COOH where R is an alkylene group of 1 to about 8 carbon atoms which may also be substituted by one or more hydroxy groups or keto groups and may also contain unsaturation. Also included are esters, salts and half salts.

A preferred $CO_2$-liberating additive may include at least one of:

fumaric acid, tartaric acid, or citric acid, citrates (such as sodium hydrogen citrate, disodium citrate), or esters of citric acid.

Esters of citric acid may include tributyl citrate, triethyl citrate, tri-C12-13 alkyl citrate, tri-C14-15 alkyl citrate, tricaprylyl citrate, triethylhexyl citrate, triisocetyl citrate, trioctyldodecyl citrate and triisostearyl citrate, isodecyl citrate and stearyl citrate, dilauryl citrate, and/or ethyl citrates (mixture of tri-, di- and monoesters), preferably tributyl citrate, triethyl citrate, isodecyl citrate, or triethylhexyl citrate.

A more preferred $CO_2$-liberating functionalization additive comprises or consists of citric acid, any ester thereof, or any salt thereof.

In some embodiments, the additional functionalization additive excludes citric acid, esters thereof, or salts thereof (such as citrates).

In some embodiments, the additional functionalization additive may comprise or may consist of an amino acid, a derivative thereof, or a salt thereof.

Generally, the amino acids are compounds as known in the art composed of an amino group and a carboxylic acid functional group. An amino group is, in accordance with IUPAC nomenclature a compound formally derived from ammonia ($NH_3$) by replacing one, two or three hydrogen atoms by hydrocarbyl groups, and having the general structures $RNH_2$ (primary amines), $R_2NH$ (secondary amines) or $R_3N$ (tertiary amines). In accordance with IUPAC nomenclature, derivatives of ammonium compounds $(NH_4^+)Y^-$ in which all four of the hydrogens bonded to the nitrogen have been replaced with hydrocarbyl groups, are considered as quaternary ammonium compounds which are not amines. That is, in the amino acids as used in accordance with the present invention the amine group, preferably the α-amine group, is a $RNH_2$, $R_2NH$ or $R_3N$ residue but not an $NR_4^+$ residue. Preferably, quaternary ammonium compounds comprising a carboxylic acid group are not used as amino acid additive in accordance with the present invention.

In some embodiment, the amino acid used as additional functionalization additive is a β-amino acid or an α-amino acid, most preferred an α-amino acid. In a preferred embodiment, the α-amino acid is selected from the group consisting of positively charged amino acids, such as arginine, histidine, and lysine, negatively charged amino acids such as aspartic acid or glutamic acid, polar uncharged amino acids such as serine, threonine, asparagine or glutamine, or cysteine, selenocysteine, glycine and proline. Particular preferred are amino acids with hydrophobic side chain, such as alanine, valine, isoleucine, leucine, methionine, phenylalanine, tyrosine and tryptophan. Most preferred amino acids used as additives are valine, isoleucine and leucine, leucine being most preferred.

α-amino acids are chiral compounds. Generally, both racemic mixtures of the both enantiomeres can be used, as well as compositions enriched in one enantiomer, e.g. the D- or the L-enantiomer. Preferably, racemic mixtures of the amino acids may be used in accordance with one embodiment of the present invention.

Suitable derivatives of amino acids are for example esters, such as esters comprising a hydroxyalkyl residue, in particular a hydroxy $C_{1-20}$ alkyl residue. Alternatively or additionally the amino acid derivative may be an amide. Suitable salts are for example alkali metal and alkali earth metal salts or salts formed between an acid, such as an inorganic acid or a carboxylic acid with the amino group of the amino acid.

The amino acid may be present in the functionalized particulate bicarbonate in the amount of at least 0.02% by weight, preferably at least 0.05% by weight, in particular at least 0.1% by weight. More than 10% by weight of the amino acid in the functionalized particulate bicarbonate is disadvantageous for cost reasons. Preferably, at most 8% by weight, more preferably at most 6% by weight, in particular at most 5% by weight of the amino acid are present in the functionalized particulate bicarbonate.

The preferred amino acid used as additional functionalization additive in the functionalized particulate bicarbonate is leucine. Leucine may for example be present in the functionalized particulate bicarbonate in an amount of 0.02% by weight to 5% by weight, preferably in an amount of 0.05% by weight to 2% by weight, more preferably in an amount of 0.05% by weight to 0.5% by weight.

In one embodiment the particulate bicarbonate being additionally functionalized with an amino acid, in particular leucine, is prepared by spray-drying.

In additional or alternate embodiments, the additional functionalization additive in the functionalized particulate bicarbonate may comprise or consist of a resin acid, a derivative thereof, or a salt thereof. This resin acid should be different than the rosin acid if already used in the functionalized particulate bicarbonate as a primary functionalization additive.

Generally, the resin acid to be used as additional functionalization additive in the functionalized particulate bicarbonate is one of the resin acids as known in the art. The resin acids refer to mixtures of related carboxylic acids, preferably abietic acid, found in tree resins. Typically, resin acids have the basic skeleton of three fused rings with an empirical formula $C_{19}H_{29}COOH$. Preferred the resin acid is a tricyclic diterpene carboxylic acid, more preferable belonging to the abietane diterpene group. Preferred resin acids are abietic-type acids, e.g. selected from the group consisting of neoabietic acid, dehydroabietic acid, and palustric acid. Also suitable are pimaric-type acids, selected from the group consisting pimaric acid (pimara-8(14),15-dien-18-oic acid), levopimaric acid, or isopimaric acid. Such acids are available from natural sources or via chemical synthesis as e.g. known from US 2014/0148572 A1.

A derivative containing resin acids that may be used is tall oil. Tall oil (also called liquid rosin) is obtained as a by-product of the Kraft process of wood pulp manufacture. Crude tall oil contains rosin, resin acids (mainly abietic acids and its isomers), fatty acids (mainly palmetic, and oleic), fatty alcohols, sterols and alkyl hydrocarbon derivatives. Most preferred pimaric acid and its salts, in particular the sodium salts, respectively are used as additional additive in accordance with the present invention.

The resin acid, derivative thereof, or salt thereof may be present in the functionalized particulate bicarbonate according to the present invention in an amount of at least 0.02% by weight, preferably at least 0.05% by weight, in particular at least 0.10% by weight. The resin acid, derivative thereof, or salt thereof, such as rosin acid, may for example be present in an amount from 0.02% by weight to 25% by weight, preferably from 0.02% by weight to 20% by weight or from 0.10% by weight to 11% by weight, such as from 0.5% by weight to 10% by weight.

The preferred resin acid used as additional functionalization additive in the functionalized particulate bicarbonate is rosin acid, derivative thereof, or salt thereof.

In yet additional or alternate embodiments, the additional functionalization additive in the functionalized particulate bicarbonate may comprise or consist of a fatty-acid, derivative thereof (such as esters), or a salt thereof. This additional functionalization fatty acid should be different than the fatty acid if already used in the functionalized particulate bicarbonate as a primary functionalization additive.

Fatty acids as used as additional functionalization additive are those fatty acids as known in the art, i.e., a carboxylic acid with an aliphatic residue, which is either a saturated or unsaturated. Preferred, the fatty acid is a compound according to formula (I)

$$R\text{---}COOH \quad (I)$$

wherein R is a saturated or unsaturated $C_6$-$C_{18}$ alkyl group, preferably a $C_{12}$-$C_{18}$ group, such as a $C_{12}$-$C_{16}$ alkyl group. The fatty acids may be used in form of their salts, in particular sodium or potassium salts, most preferably sodium salt. Even more preferred residue R is a $C_{16}$-$C_{18}$ alkyl group, most preferred, the fatty acid is palmetic acid, linoleic acid, lauric acid or stearic acid, the latter being most preferred.

Examples of fatty acid derivatives are glycerides. Glycerides are esters formed from glycerol and fatty acids, in particular glycerol mono, di and tri fatty esters.

The preferred fatty acid used as additional functionalization additive in the functionalized particulate bicarbonate is stearic acid, an ester thereof, or a salt thereof. The more preferred fatty acid used as additional functionalization additive in the functionalized particulate bicarbonate is stearic acid, a stearate salt, or an ester of stearic acid, such as its ester with glycerol, such as tristearin, or glyceryl tristearate, which is a triglyceride derived from three units of stearic acid. Another preferred additional functionalization additive is glycerol mono stearate.

The fatty acid, derivative thereof, or salt thereof as additional functionalization additive may be present in the functionalized particulate bicarbonate in an amount of at least 0.02% by weight, preferably at least 0.05% by weight, in particular at least 0.1% by weight. In certain embodiments the fatty acid, derivative thereof, or salt thereof may be present in the functionalized particulate bicarbonate in an amount of from 0.02% by weight to 30% by weight, preferably from 0.1% by weight to 10% by weight, more preferably from 0.5% by weight to 7% by weight.

In some embodiments, the additional functionalization additive may exclude stearic acid, an ester thereof, or salts thereof.

In yet more additional or alternate embodiments, the additional functionalization additive may comprise or consist of a polymer, such as a polymer selected from the group consisting of polyvinylalcohol, polyglycol, polysaccharide, poly(meth)acrylic acid, poly(acrylic acid co-maleic acid, polyethylenenimine, polyvinylpyrrolidone, N-2(-Hydroxypropyl) methacrylamide, polyoxyalkylenes and derivatives thereof including polyethylene glycols, and combinations thereof.

The polymer may be a natural or synthetic polymer. Natural polymers are polymers being from natural sources, such as starch and arabic gum. Natural polymers may also be modified, such as hydrolyzed starch.

Synthetic polymers are for example poly(meth)acrylates and derivatives thereof, polyoxyalkylenes and derivatives thereof including polyethylene glycols, and polyvinylalcohols. A preferred polyoxyalkylene derivative is for example a polymer offered under the trade name BYK 3155 by BYK-Chemie GmbH. Meth-/acrylic polymers may for example be anionic polymers with methacrylic acid as functional groups, cationic polymers with methylaminoethyl methacrylates as functional groups, meth-/acrylate copolymers with trimethyl-aminoethyl-methacrylate as functional groups and neutral polymers of meth-/acrylates which are available from Evonik under the trade name Eudragit®. Suitable Eudragit® grades are for example grades L, S, FS, E, RL, RS, NE and NM. Preferred are Eudragits® of grade RL, in particular Eudragit® RL 30D.

Polyethylene glycols are available in a wide range of different molecular weights. In one embodiment of the present invention low molecular weight polyethylene glycols having a molecular weight below 1000 g/mol can be used, preferably a polyethylene glycol having a molecular weight in the range of from 200 to 600 g/mol, such as in the range of from 300 to 500 g/mol, preferably PEG400. In another embodiment of the present invention a high molecular weight polyethylene glycol having a molecular weight of 1000 g/mol or above may be employed. Preferably the high molecular weight polyethylene glycol has a molecular weight of from 1000 to 10000 g/mol, more preferably from 2000 to 8000 g/mol, such as PEG4000.

In some embodiments, when a polysaccharide is used as additional functionalization additive in the functionalized particulate bicarbonate, the polysaccharide additional functionalization additive may be at least one polysaccharide selected from the group consisting of hydrolyzed starch, carboxymethylcellulose, alginic acid and salts thereof, arabic gum, carrageenan, guar gum, locust bean gum, xantham gum, and combinations thereof.

The additional functionalization additive in the functionalized particulate bicarbonate may comprise or consist of a polysaccharide selected from the group consisting of:
  guar gums and their derivatives, in particular hydroxypropyl guar (such as Jaguar HP-105);
  alginic acid and its salts, such sodium, calcium or copper (e.g., Kaltostat, Calginat, Landalgine, Kalrostat, Kelacid, Vocoloid, Xantalgin); and
  carboxymethylcellulose (e.g., Aquaplast, Carmethose, CELLOFAS, Cellpro, Cellugel, Collowel, Ethoxose, Orabase, Lovosa).

In another embodiment the additional functionalization additive of the functionalized particulate bicarbonate may comprise or consist of a modified, in particular hydrolyzed starch or a compound comprising such starch. Particularly preferred additives of this class are hydrolyzed starch, arabic gum and maltodextrin, maltodextrin being particularly preferred. The polymer may be present in the functionalized particulate bicarbonate in an amount of at least 0.02% by weight, preferably at least 0.05% by weight, more preferably at least 0.1% by weight. In particular the hydrolyzed starch, arabic gum, maltodextrin, polyoxyalkylene derivatives including polyethylene glycols, poly(meth)acrylate, and polyvinylalcohol may for example be present in an amount of between 0.02% by weight to 40% by weight, more preferably from 0.1% by weight to 35% by weight, even more preferably from 1% by weight to 20% by weight, such as from 2% by weight to 10% by weight.

In one embodiment the functionalized particulate bicarbonate comprises at least one polymer as additional functionalization additive together with the rosin acid, any derivative thereof or salts thereof. In this combination the polymer preferably is selected from the group consisting of polyoxyalkylenes and derivatives thereof including polyethylene glycols, poly(meth)acrylates and derivatives thereof, polyvinyl alcohol and polysaccharides, including modified, in particular hydrolyzed starch, maltodextrin and arabic gum. Polyethylene glycols of high or low molecular weight (as defined above) and in particular low molecular weight polyethylene glycol are preferred.

In a specific embodiment of the combination of rosin acid or any derivative or salt thereof and polyethylene glycol (preferably low molecular weight polyethylene glycol) as additives of the functionalized particulate bicarbonate the rosin acid is present in an amount of from 5% by weight to 20% by weight, preferably of from 7% by weight to 11% by weight of the total amount of functionalized particulate bicarbonate and the polyethylene glycol is present in an amount of from 1% by weight to 30% by weight, preferably of from 5% by weight to 25% by weight, such as for example about 10% by weight or about 20% by weight, each of the total amount of the functionalized particulate bicarbonate.

In a further preferred embodiment the functionalized particulate bicarbonate comprising rosin acid or any derivative or salt thereof as first additive and a polymer and, in particular, polyethylene glycol as second additive is prepared by first co-milling bicarbonate particles in the presence of the rosin acid or derivative or salt thereof and the thus obtained functionalized particles are then mixed with the polymer and extruded to obtain particulate bicarbonate being functionalized with rosin acid and polymer, in particular polyethylene glycol.

Oils used as additional functionalization additive in the present invention may be organic oils or mineral oils which may be of animal, vegetable, or petrochemical origin. Suitable oils are for example olive oil, maize oil, sunflower oil and soybean oil.

The oil may be chemically modified, such as epoxidized. A preferred oil is epoxidized soybean oil. The oil may be present in the functionalized particulate bicarbonate in an amount of at least 0.02% by weight, preferably at least 0.05% by weight, in particular at least 0.1% by weight. In preferred embodiments the oil can be present in the functionalized particulate bicarbonate in an amount of from 0.1% by weight to 10% by weight, more preferably from 10% by weight to 7% by weight.

In a further embodiment the additional functionalization additive in the functionalized particulate bicarbonate is a wax, such as bees wax or carnauba wax.

The wax may be present in the functionalized particulate bicarbonate according to the present invention in the amount of at least 0.02% by weight, preferably at least 0.05% by weight, in particular at least 0.1% by weight. The wax can for example be present in an amount of from 1% by weight to 30% by weight, preferably from 5% by weight to 25% by weight.

Additional information on particular properties of functionalized particulate bicarbonate can be found in EP3037388A1 by SOLVAY SA when the additive comprises or consists of a resin acid or fatty acid as additive; and in WO2018/015506 by SOLVAY SA when the additive may be selected from the group consisting of polymers; inorganic salts; oils; fats; resin acids, any derivative thereof, and salts thereof; amino acids; fatty acids; carboxylic or polycarboxylic acids, soaps; waxes; derivatives thereof (such as esters); salts thereof: or any combinations thereof and in which the particulate bicarbonate may be functionalized by spray-drying, coating, extrusion or co-grinding with at least one additive.

In some embodiments, the functionalized bicarbonate may further comprise a processing aid, an anti-caking agent and/or a flow aid.

This processing aid, anti-caking agent and/or flow aid may be first mixed with the functionalization additive before their mixture is used to functionalize the particulate bicarbonate. Alternatively, this processing aid, anti-caking agent and/or flow aid may be mixed with the functionalized bicarbonate. For example, the functionalized bicarbonate powder may be mixed in a Lödige-type "ploughshare" mixer by introducing the processing aid, anti-caking agent and/or flow aid progressively.

In some preferred embodiments, the functionalized bicarbonate may further comprise silica. Silica may be used as a processing aid, an anti-caking agent and/or a flow aid for the functionalized bicarbonate. It is recommended that the silica is in amorphous (and noncrystalline) form. Preferably the silica in the functionalized bicarbonate is amorphous precipitated silica. The functionalized bicarbonate may comprise at least 0.1 wt %, preferably at least 0.2 wt %, preferably at least 0.5 wt % of silica based on the total composition of the functionalized bicarbonate. It is recommended that the functionalized bicarbonate comprises not more than 5 wt %, preferably not more than 4 wt % silica, more preferably not more than 3 wt % silica. The presence of silica can improve the flow of the functionalized bicarbonate and therefore promotes its homogeneous application as a chemical foaming agent in a foamable polymer composition.

In preferred embodiments, the functionalized bicarbonate may further comprise from 0.1 wt % to 5 wt % or from 0.2 wt % to 4 wt % or from 0.5 wt % to 3 wt % or from 0.5 wt % to 1.5 wt % silica, preferably amorphous silica, more preferably amorphous precipitated silica.

It is preferable that the silica is in the form of very fine particles, having a high specific surface area, for example greater than 180 $m^2/g$, preferably at least 200 $m^2/g$, more preferably at least 400 $m^2/g$, measured according to the ISO 5794-1 standard, annex D.

According to an advantageous embodiment, the silica in the functionalized bicarbonate is in the form of particles having a mean diameter of less than 20 μm, preferably having a mean diameter of at most 15 μm, or at most 10 μm, more preferably at most 8 μm. The mean diameter is measured according to the ASTM C-690-1992 standard.

Suitable commercially available silicas are: amorphous silica Sipernat® 50S, manufactured by the company Degussa; amorphous silica Sipernat 22 S produced by Degussa, having a lower specific surface of 190 $m^2/g$ instead of 450 m²/g for Sipernat 50S; silica Tixosil® 38AB produced by Rhodia (owned by Solvay) having a larger mean diameter of 15 μm (instead of 7 μm for Sipernat 50S and 22S). Tixosil® anti-caking agents from Rhodia with their controlled particle size are effective flow-conditioning agents for powders adversely affected by moisture or humidity, pressure, or static charge.

In some embodiments, the functionalized bicarbonate may comprise a weight ratio of sodium bicarbonate to silica of from 12:1 to 990:1, preferably from 14:1 to 99:1, more preferably from 16:1 to 97:1.

The functionalized particulate bicarbonate may be prepared from a solution containing a bicarbonate ingredient or directly from an already-formed particulate bicarbonate.

The bicarbonate ingredient or particulate bicarbonate may comprise or consists essentially of ammonium bicarbonate, sodium bicarbonate, potassium bicarbonate, or mixtures thereof, in particular the bicarbonate ingredient or particulate bicarbonate comprises or consists essentially of sodium bicarbonate. The bicarbonate ingredient or particulate bicarbonate preferably comprises at least 80 wt % of sodium bicarbonate.

The functionalized particulate bicarbonate may be obtained by encapsulation or coating processes.

In particular, the process for preparing functionalized particulate bicarbonate, preferably a functionalized particulate alkali metal bicarbonate as described above may be carried out by at least one of the following techniques: by spray-drying (also known as atomization), wherein the additive is dissolved in the bicarbonate-containing solution.
by grinding or co-grinding (also known as milling or co-milling) with the additive(s) in emulsion or powder form;
by spray coating and granulation within a fluidized bed,
by spray agglomeration within a fluidized bed,
by spray chilling (e.g., spray cooling, spray freezing),
by roller compaction, and/or
by extrusion, including simultaneous mixing/extrusion.

It should be understood that one or more techniques from this list may be omitted.

Spray-drying or drying by atomization is a drying technique. This method comprises spraying the product to be dried, which is in the form of a solution (or a suspension) in a stream of hot gas, so as to obtain a powder in a few seconds or fractions of seconds. The separation of a solution into fine droplets gives rise to a large material transfer surface and it leads to rapid evaporation of the solvent of the solution used.

Suitable apparatus for spray-drying are known in the art, and generally comprise several modules: a module comprising a circuit for storing and atomizing the solution comprising equipment for atomizing or spraying the solution, a module for the preparation of hot gas and its transfer to a drying chamber where it comes into contact with the sprayed solution, a drying chamber where the sprayed solution is evaporated and the particles are formed, and a module for collecting the particles, generally comprising a cyclone and/or a suitable filter.

Generally, the equipment for atomizing or spraying the solution is a compressed gas sprayer or a dispersion turbine. Also ultrasound nozzles can be used for spraying the solution.

In the spray-drying process generally an aqueous solution of the bicarbonate is used. While other polar solvents or mixtures of polar solvents, for examples mixtures of water and ethanol, in which the additive is soluble, may be used, water is the preferred solvent.

In the spray-drying method the aqueous solution to be spray-dried comprises 1 to 10% by weight of the bicarbonate ingredient. The bicarbonate ingredient in the solution is preferably an alkali metal bicarbonate. The solution to be spray-dried further comprises 1 to 10,000 ppm of an additive or salt thereof. The additive used is preferably one of those as described above for the particulate functionalized bicarbonate. In preferred embodiments, the content of the additive in the solution to be spray-dried is 1 to 5,000 ppm, more preferred 1 to 3,000 ppm, in particular 10 to 2,000 ppm, e.g. 50-1,000 ppm of additive per kg of solution to be spray-dried. Generally, the aqueous solution comprises at least 1 mg, preferably at least 5 mg, more preferably at least 10 mg, even more preferred at least 100 mg of the additive per kg of aqueous solution. Generally, the aqueous solution comprises at most 2,000 mg, preferably at most 1,500 mg, more preferably at most 1,200 mg of the additive per kg of aqueous solution. In case of salts, weight percentages are given based on the free base/acid.

Generally, in the spray-drying process in the method for making the functionalized particulate bicarbonate, the aqueous solution comprises at least or more than 1%, preferably at least or more than 2%, more preferably at least or more than 3%; even more preferably at least or more than 4%, in particular at least or more than 5% by weight of the bicarbonate ingredient. Preferably, the bicarbonate ingredient comprises or consists essentially of sodium bicarbonate and/or potassium bicarbonate, in particular comprise or consists essentially of sodium bicarbonate. A high concentration of the bicarbonate ingredient in the aqueous solution is detrimental as leading to high speed plugging of the spraying or atomizing device. Therefore it is generally recommended that the aqueous solution comprises at most or less than 10% by weight, preferably at most or less than 8% by weight, more preferably at most or less than 6% by weight of the bicarbonate ingredient, in particular sodium bicarbonate. Preferably, the bicarbonate-containing solution is an aqueous solution comprising 1%-10%, advantageously 3%-8%, more advantageously 4%-8% by weight, such as 4%-6% by weight of the bicarbonate ingredient, in particular sodium bicarbonate.

The drying with a hot gas breaks part of the alkali metal bicarbonate down into the form of sodium carbonate, $CO_2$ and water. In one advantageous embodiment, the spray-drying is carried out in a gas comprising at least 5%, advantageously at least 10%, more advantageously at least 20%, and even more advantageously at least 30% of $CO_2$ by volume on a dry gas bases. This enables to limit the bicarbonate decomposition into carbonate solid and $CO_2$ gas and water vapor. Generally, the spray-drying is carried out with a gas preheated between 40° C. and 220° C. Advantageously the spray-drying is carried out in a spray-drying chamber and wherein the gas is preheated before being introduced into the spray-drying chamber at least 40° C., preferably at least 50° C., more preferably at least 60° C., even more preferably at least 70° C. Also advantageously, the gas is preheated before being introduced into the spray-drying chamber at most 220° C., preferably at most 200° C., more preferably at most 180° C., even more preferably at most 130° C.

It is preferable for the temperature of the gas after the spray-drying operation to be at most 80° C., advantageously at most 70° C. and more advantageously at most 60° C.

In one embodiment in the method for making functionalized particulate bicarbonate, the aqueous solution is preheated to a temperature of at least 20° C. and preferably at most 80° C. before being sprayed during the spray-drying operation. In one particular embodiment, the aqueous solution is preheated to a temperature of at least 20° C. and at most 25° C. before being sprayed during the spray-drying operation.

The method for making functionalized particulate bicarbonate may comprise co-grinding of the bicarbonate ingredient in the presence of the additive, such as in the presence of 0.02 to 10 parts by weight of an additive per 100 parts per weight of the substance undergoing co-grinding. The bicarbonate ingredient and the additive are preferably as defined above.

In the process for preparing the functionalized particulate bicarbonate by co-grinding, all suitable grinding procedure as known in the art can be used.

Typical devices include impact mills, which are mills in which the material be milled as subjected to the impact of moving mechanical part and that have the effect of fragmenting the particles of the material. Impact mills are well-known in the fine milling art. Such mills include hammer mills, spindle mills, attritor mills, jet mills, ball mills, such as planetary ball mills, and cage mills. Such mills are e.g. manufactured and available by Grinding Technologies and System SRL or by Hosokawa Alpine AG. Most preferred, an Alpine LGM 3 is used. In the process for preparing the alkali metal bicarbonate particles, the alkali metal bicarbonate is grinded in the presence of the additive, i.e. the amino acid as defined above. Either the total amount of bicarbonate and additive is added into the mill at once, followed by milling or preferably the bicarbonate and the additive are fed into the milling device at a constant rate. Suitable rates for the bicarbonate are 50 kg/h to 500 kg/h, preferably 100 kg/h to 400 kg/h, e.g. about 150 kg/h. The amount of additive corresponds to the weight ratio of the bicarbonate ingredient and additive used. For examples, if the bicarbonate ingredient is co-grinded in the presence of 1 part by weight of an additive, per 100 parts by weight of the substance undergoing co-grinding, the feeding rate of the additive is only 1% of the feeding rate of the bicarbonate ingredient.

The amount of additive (e.g., a fatty acid, a rosin acid, derivatives thereof, or salts thereof, or combinations thereof) in the process for preparing the functionalized particulate bicarbonate by co-grinding, is from 0.02 to 10 parts by weight per 100 parts by weight of the substance undergoing co-grinding. Below 0.02 parts by weight, there is only low efficacy of the additive. Using higher amounts than 10 parts by weight of the additive is disadvantageous for cost reasons. Preferred amounts are 0.2-8 parts by weight of the additive, more preferred 0.5-5 parts by weight of additive, even more preferred 0.8-2 parts by weight of additive, in particular about 1 part by weight of additive, each per 100 parts by weight of the substance (typically the bicarbonate ingredient and the at least one additive) undergoing co-grinding.

In some embodiment, the method for making functionalized particulate bicarbonate may comprise spray coating, for example within a fluidized bed. Spray coating within a fluidized bed is a technique in which a powder (solid particles of the bicarbonate ingredient) is fed into a fluidization chamber. A gas fluidizes the powder from the chamber bottom through a grid. A liquid which comprises the additive in dissolved form, in a melted form, and/or in dispersed solid form (for example a solution, an emulsion, a suspension, a melt, a melt emulsion or a melt suspension) is sprayed into the fluidized powder to apply a layer or coating onto particles.

In some embodiment, the method for making functionalized particulate bicarbonate may comprise spray granulation, for example within a fluidized bed. The fluidized bed spray granulation is a method for making free-flowing granulate from liquids. The liquid containing solids, such as aqueous solutions, emulsions, suspensions, melts, melts emulsions or melts suspensions, is sprayed into a fluidized bed system. The solids are preferably bicarbonate particles. Due to the high heat exchange the aqueous or organic solvent in the liquid evaporates immediately, and the solids form small particles as starter cores. These are sprayed with another liquid with contains the additive (solution/suspension). A gas fluidizes the additive solution/suspension sprayed into a chamber. After evaporation and drying in the fluidized bed, the dried additive forms a hard coating around the starter core. This step is continuously repeated in the fluidized bed so that the granulate grows to form onion-like or blackberry-like structures. An onion-like structure is obtained from layer by layer coating. Alternatively, a defined volume of suitable starter cores can be provided. In this option, the liquid only serves as a vehicle for the solids that are being applied.

In some embodiment, the method for making functionalized particulate bicarbonate may comprise spray agglomeration, for example within a fluidized bed. Spray agglomeration within a fluidized bed is a technique in which a powder or a fine granulate is fed into a fluidization chamber. A gas fluidizes the powder from the chamber bottom through a grid. A liquid (either a solution, an emulsion, a suspension a melt, a melt emulsion or a melt suspension), which acts as a binder, is sprayed on the fluidized particles. Liquid bridges are created that form agglomerates from the particles. Spraying continues until the desired size of the agglomerates is reached.

In some embodiment, the method for making functionalized particulate bicarbonate may comprise spray chilling (or spray cooling, spray freezing). Spray chilling is a technique in which a melt, a melt emulsion or a melt suspension is sprayed into a fluidization chamber. A cold gas in injected in the fluidization chamber. The solidification of solid particles is achieved by the melt droplets losing heat to cold air in the fluid bed.

In some embodiment, the method for making functionalized particulate bicarbonate may comprise roller compaction. Roller compaction is a technique in which powder particles are made to adhere to each other by applying a force onto the powder, which causes a considerable size enlargement. The powder is compacted between two counter rotating rolls to apply a force. The obtained briquettes, flakes or ribbons are crushed out of the rolls to reach a desired particle size.

In some embodiment, the method for making functionalized particulate bicarbonate may comprise extrusion (or mixing extrusion). Extrusion (or mixing extrusion) is a technique in which a powder or another material is pushed through a die of a fixed cross-section. A screw, two screws or a succession of paddles may help pushing the material through mixing, degassing and homogenizing phases. Temperature control along the distance allows for phase changing, melting, crystallization, chemical reaction, coating or granulating the materials.

In some embodiments when the functionalized bicarbonate further comprises silica, preferably amorphous silica, more preferably amorphous precipitated silica, silica may be first mixed with the functionalization additive before their mixture is used to functionalize the particulate bicarbonate. Alternatively, silica may be mixed with the functionalized bicarbonate after it is prepared. For example, the functionalized bicarbonate powder may be mixed in a Lödige-type "ploughshare" mixer by introducing the silica progressively into the functionalized bicarbonate. Silica may be used in the functionalized bicarbonate as a processing aid, an anti-caking agent (such as acting as a dessicant for water capture), and/or a flow aid. For example the functionalized bicarbonate powder may be mixed with amorphous precipitated silica to form a free-flowing powder.

The chemical blowing agent for foaming a polymer comprises the functionalized particulate bicarbonate as described in the various embodiments herein, wherein the functionalized particulate bicarbonate contains at least one additive as described in the various embodiments herein. Optionally, the functionalized particulate bicarbonate may further comprise a processing aid, an anti-caking agent (such as acting as a dessicant for water capture), and/or a flow aid. In some embodiments, the functionalized particulate bicarbonate may further comprise silica, preferably amorphous silica, more preferably amorphous precipitated silica, as described in the various embodiments herein.

In some embodiments, the chemical blowing agent for foaming a crosslinkable polymer comprises a functionalized particulate bicarbonate having a particle size D50 of 1000 nm or less.

In alternate embodiments, the chemical blowing agent for foaming a crosslinkable polymer comprises a functionalized particulate bicarbonate having a particle size D50 more than 1 micron and up to 250 µm, preferably up to 100 µm, more preferably up to 60 µm, yet more preferably up to 40 µm, or up to 30 µm, or up to 25 µm.

Any particular embodiments for the functionalized particulate bicarbonate and the additive(s) used for its functionalization described herein are applicable here.

In some embodiments, the chemical blowing agent does not contain a compound which liberates nitrogen gas during heating.

In some embodiments, the chemical blowing agent does not contain a compound which liberates ammonia during heating.

In preferred embodiments, the chemical blowing agent is an endothermic chemical blowing agent comprising the functionalized particulate bicarbonate as described in the various embodiments herein.

In preferred embodiments, the chemical blowing agent does not contain an exothermic blowing agent.

In some embodiments, the chemical blowing agent comprises the functionalized particulate bicarbonate and further comprises a second compound as another blowing agent.

The second compound is preferably an endothermic blowing agent.

The second compound preferably can liberate $CO_2$ upon heating. This second compound preferably increases the $CO_2$ generation which is already formed by the decomposition of the functionalized particulate bicarbonate upon heating.

This $CO_2$-liberating second compound acting as blowing agent may be a carboxylic or polycarboxylic acid, derivative thereof (such as esters), or salts thereof.

Suitable carboxylic acids include those of the formula: HOOC—R—COOH where R is an alkylene group of 1 to about 8 carbon atoms which may also be substituted by one or more hydroxy groups or keto groups and may also contain unsaturation. Also included are esters, salts and half salts.

A preferred $CO_2$-liberating second compound acting as blowing agent may include at least one of:
fumaric acid,
tartaric acid, or
citric acid, citrates (such as sodium hydrogen citrate, disodium citrate), or esters of citric acid.

Esters of citric acid may include tributyl citrate, triethyl citrate, tri-C12-13 alkyl citrate, tri-C14-15 alkyl citrate, tricaprylyl citrate, triethylhexyl citrate, triisocetyl citrate, trioctyldodecyl citrate and triisostearyl citrate, isodecyl citrate and stearyl citrate, dilauryl citrate, and/or ethyl citrates (mixture of tri-, di- and monoesters), preferably tributyl citrate, triethyl citrate, isodecyl citrate, or triethylhexyl citrate.

A more preferred $CO_2$-liberating second compound acting as endothermic blowing agent comprises or consists of citric acid, esters therof, or salts thereof.

In yet alternate embodiments, the chemical blowing agent may further comprise an exothermic chemical blowing agent, preferably selected from the group consisting of ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), and TSH (toluene-4-sulfonohydrazide), 5-PT (5-phenyltetrazole), more preferably may further comprise ADCA (azodicarbonamide). In such embodiments, the chemical blowing agent may comprise a weight ratio of the functionalized bicarbonate to the exothermic chemical blowing agent from 5:95 to 95:5, preferably 90:10 to 10:90, more preferably 85:15 to 15:85, yet more preferably 80:20 to 20:80.

Optionally, the chemical blowing agent comprising the functionalized particulate bicarbonate may further comprise a processing aid, an anti-caking agent (such as acting as a dessicant for water capture), and/or a flow aid.

In preferred embodiments, the chemical blowing agent comprises a mixture of the particulate functionalized particulate bicarbonate and silica, preferably amorphous silica, more preferably amorphous precipitated silica.

It is also envisioned that a second $CO_2$-liberating compound in the blowing agent composition which supplements $CO_2$ generation may also be in a functionalized particulate form. This functionalized particulate second compound would comprise an additive as described herein in relation to the functionalized particulate bicarbonate. This functionalization of the particulate second compound may also use one or more techniques as described above in relation to the making of the functionalized particulate bicarbonate.

In some embodiments, the endothermic blowing agent comprises, or consists essentially of, or consists of:
the functionalized particulate bicarbonate, as described herein in the various embodiments; and
a functionalized particulate carboxylic or polycarboxylic acid, derivative thereof (such as esters), or salts thereof.

In particular embodiments, the endothermic blowing agent comprises, or consists essentially of, or consists of:
the functionalized particulate bicarbonate, as described herein in the various embodiments; and
a functionalized particulate carboxylic or polycarboxylic acid, derivative, or salt thereof, selected from the group consisting of: fumaric acid, tartaric acid, citric acid, salts thereof (such as sodium hydrogen citrate, disodium citrate), esters thereof, and any combination thereof.

In some embodiments, the chemical blowing agent for foaming a crosslinkable polymer comprises the functionalized particulate bicarbonate and a functionalized particulate second compound (e.g., functionalized carboxylic or polycarboxylic acid, derivative, or salt thereof), both having a particle size D50 of 1000 nm or less.

In alternate embodiments, the chemical blowing agent for foaming a crosslinkable polymer comprises the functionalized particulate bicarbonate and a functionalized particulate second compound (e.g., functionalized carboxylic or polycarboxylic acid, derivative, or salt thereof), both having a particle size D50 more than 1 micron and up to 250 microns, preferably up to 30 microns.

In yet alternate embodiments, the chemical blowing agent for foaming a crosslinkable polymer comprises a functionalized particulate bicarbonate having a particle size D50 of 1000 nm or less and a functionalized particulate second compound (e.g., functionalized carboxylic or polycarboxylic acid, derivative, or salt thereof) having a particle size D50 more than 1 micron and up to 250 microns, preferably up to 30 microns.

In embodiments where the endothermic blowing agent comprises the functionalized particulate bicarbonate and the functionalized particulate second compound (e.g., functionalized carboxylic or polycarboxylic acid, derivative, or salt thereof), the method for making such blowing agent may contain the following steps:
  A/ making the functionalized particulate bicarbonate using a first additive (wherein the first additive is selected from those defined herein); separately making the functionalized particulate second compound using a second additive (wherein the second additive is selected from those defined herein); mixing the functionalized particulate bicarbonate and the functionalized particulate second compound to make the endothermic blowing agent; or
  B/ mixing the particulate bicarbonate and the particulate second compound before functionalization to make a non-functionalized particulate mixture; and functionalizing the non-functionalized particulate mixture using at least one additive (as defined herein) to make the endothermic blowing agent.

In the method A/, the first and second additives may be the same or may be different. The techniques to make the functionalized particulate bicarbonate and the functionalized particulate second compound may be the same or may be different.

In the method B/, the additive and the technique for functionalization of the particulate bicarbonate and the particulate second compound is generally the same, thus resulting in less flexibility in the making of the endothermic blowing agent. However this method would be more cost effective.

The process for preparing the foamable polymer composition may comprise:
  mixing the components of the foamable polymer composition as provided herein, wherein a component of the foamable polymer composition is the functionalized particulate bicarbonate.

The mixing step in the process may be carried out under continuous or batch mixing. The mixing may be carried out from 1 to 30 minutes, preferably from 5 to 20 minutes, for example in a kneader to blend the ingredients and then cryo-milled (using liquid nitrogen) or calendared (such as 40° C. The selection of the mixing conditions depends upon the specific characteristics of the equipment. The mixing step(s) of the process for preparing the foamable polymer composition can be carried out at any suitable temperature as in conventional foam production.

The foamable polymer composition may be prepared by mixing
  the functionalized particulate bicarbonate in powder form as described herein,
  optionally, an exothermic blowing agent, such as ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), and TSH (toluene-4-sulfonohydrazide), 5-PT (5-phenyltetrazole), and optionally a kicker for the exothermic blowing agent, such as ZnO;
  at least one foamable crosslinkable polymer,
  a crosslinking peroxide compound; and
  optionally one or more additives such an inorganic filler and/or dye.

The foamable composition may optionally comprise a functionalized particulate second compound used as supplemental endothermic chemical blowing agent for foaming (as described herein). The functionalized particulate second compound may be a functionalized particulate carboxylic or polycarboxylic acid, derivative, or salt thereof. The functionalized particulate second compound may be selected from the group consisting of: fumaric acid, tartaric acid, citric acid, salts thereof (such as sodium hydrogen citrate, disodium citrate), esters thereof, and any combination thereof.

A further aspect of the present invention relates to a process for preparing a foamed polymer, wherein the above described foamable polymer composition is heated.

Foamed polymers produced using the blowing agent and the above discussed foamable polymer composition can be made by processes that involve extrusion, calendering, injection molding, compression molding, coating, expansion casting or rotational molding.

In a preferred embodiment, the process for preparing a foamed polymer can comprise the following step:
  mixing the components of the foamable polymer composition as provided herein; and
  heating the foamable polymer composition obtained from mixing.

Preferably, the heating step is carried out immediately after the completion of the mixing step.

The process for preparing a foamed polymer may include a shaping step such as molding.

In some embodiments, the process for preparing the foamed polymer may comprise:
  pre-heating the mixed foamable polymer composition in a furnace to soften the polymer before molding (such as at 80-120° C., preferably at about 100° C. for about 5 minutes);
  injecting the pre-heated foamable composition into a mold and heating in the mold at a predetermined temperature (generally from about 180 to 190° C. for EVA and XPLO) to allow generation of gas from the chemical blowing agent and crosslinking of the polymer for a predetermined time (generally from 4 to 10 minutes, preferably from 4 to 7 min) and at a given pressure (such as from 1 to 3 bars);
  after the predetermined time, opening the mold which causes the polymer to expand by release of the gas due to pressure drop to form a foamed polymer; and
  cooling the foamed polymer to room temperature, preferably without applying any cooling device or cooling method.

In some embodiments, the process for preparing the foamed polymer may comprise:
- pre-heating the mixed foamable polymer composition in a furnace to soften the polymer before molding (such as at 80-120° C., preferably at about 100° C. for about 5 minutes);
- compression molding the pre-heated foamable composition into a mold and heating in the mold at a predetermined temperature (generally from about 180 to 190° C. for EVA and XPLO) to allow generation of gas from the chemical blowing agent and crosslinking of the polymer for a predetermined time (generally from 4 to 10 minutes, preferably from 4 to 7 min) and at a given pressure (such as from 1 to 3 bars);
- after the predetermined time, opening the mold which causes the polymer to expand by release of the gas due to pressure drop to form a foamed polymer; and
- cooling the foamed polymer to room temperature, preferably without applying any cooling device or cooling method.

The heating in the mold may be carried out at a temperature from about 120° C. and up to about 220° C., or from about 120° C. and up to about 210° C., or from about 120° C. and up to about 200° C., or from about 170° C. and up to about 195° C., or from about 175° C. and up to about 190° C., depending on the resin and the composition of the polymer.

The time of heating in the heating step depends on the formulation of the polymer, shape of the material, temperature and the like.

In the process for preparing a foamed polymer from the above-mentioned foamable polymer composition, the time during the heating period in the presence of the functionalized particulate bicarbonate as the blowing agent is less than that in the presence of azodicarbonamide as the blowing agent (while all other components remain the same).

When foamable polymer composition comprises the functionalized particulate bicarbonate, the heating time at temperature above glass transition temperature Tg and/or above melting temperature Tm of the polymer preferably is at least 4 minutes and up to 10 minutes, or 8 minutes or less, in particular 7 minutes or less.

Generally the time at which the polymer is held at the heating temperature depends on the foaming agent used. For some functionalized particulate bicarbonate as foaming agents, shorter heating times can be of advantage for EVA or crosslinked XPLO, such as when functionalized particulate bicarbonate comprises a rosin acid or a derivative, such as comprising abietic acid and/or dihydroabietic acid. In such instance, the foamed EVA or crosslinked XLPO polymer foams have good expansion rate obtained at rather short heating times, compared to that obtained when the chemical blowing agent consists of ADCA and its kicker ZnO. For bicarbonate particles being functionalized with a rosin acid or a derivative, such as comprising abietic acid and/or dihydroabietic acid, good results at a shorter time are also in particular achieved if the heating temperature is rather low, such as below 200° C., in particular in the range of 175 to 190° C.

For some embodiments of a process for manufacturing a foamed EVA and/or XLPO polymer, when the foamable polymer composition is heated, the temperature suitable for liberating $CO_2$ gas from the functionalized particulate sodium bicarbonate and melting and crosslinking the EVA or PO polymer may be from 175 to 195° C., preferably from 178 to 190° C., during a predetermined time from 4 to 7 minutes at a temperature to provide a foamed EVA or crosslinked PO polymer.

A further aspect of the present invention relates to a foamed polymer, wherein the foamed polymer is obtainable from the foamable composition as described above.

The resulting foamed polymer can be advantageously used for footwear applications such as shoe or sole, or for automotive applications.

The crosslinked foamed polymers may be selected from the group consisting of polyolefins (PO), a polyolefin elastomers (POE), polyolefin block co-polymers (OBC), ethylene vinyl acetate copolymers (EVA), or combinations thereof such as EVA/PO copolymers, preferably polyethylenes, polypropylenes, ethylene vinyl acetate copolymers, ethylene/alpha-olefin block co-polymers or combinations thereof.

In preferred embodiments of the invention, the foamed polymer is a foamed EVA and/or XLPO.

The foamed EVA and/or XLPO can be advantageously used for footwear applications such as shoe or sole, or for automotive applications.

The foamed crosslinked polymer foam may be characterized by cell size equal or below 250 µm. The cell size distribution may be bimodal with few large cells (200-250 µm) and a large number of small cells (50 to 100 µm).

The EVA and/or XLPO foamed polymer may have an expansion ratio of at least 2.70, preferably at least 2.80, more preferably at least 2.9 and/or has a density of less than 0.4 $g/cm^3$, preferably less than 0.38 $g/cm^3$, more preferably at most 0.35 $g/cm^3$, yet more preferably at most 0.33 $g/cm^3$, most preferably at most 0.31 $g/cm^3$. The expansion ratio is calculated based on the formula provided in the section 2.4 Foam characterization.

In some embodiments in which an EVA and/or XLPO foam is made from a foamable EVA and/or PO composition containing a functionalized particulate bicarbonate with at least one additive, the EVA and/or XLPO foam has a density from 0.20 to 0.35 $g/cm^3$, preferably a density from 0.22 to 0.32 $g/cm^3$, more preferably a density from 0.24 to 0.3 $g/cm^3$.

The additive in the functionalized particulate bicarbonate is preferably in an amount of from 1 wt % to 15 wt % or from 2 wt % to 10 wt % and selected from the group consisting of linoleic acid, rosin acid, any derivatives thereof, and any combination of two or more thereof, preferably rosin acid or a derivative comprising abietic acid and/or dehydroabietic acid. The functionalized particulate bicarbonate preferably further comprises silica, preferably in an amount from 0.5 wt % to 2 wt %.

The foamable EVA and/or PO composition may comprise from 1.5 to 6 wt %, preferably from 3 to 6 wt %, more preferably from 3.5 to 5.5 wt %, of the functionalized particulate bicarbonate.

Different variants of the foamable polymer composition, the process for making foamed crosslinked polymers from said variants of the foamable polymer composition are described in more detail below.

ITEM 1. A foamable polymer composition comprising:
- a crosslinkable polymer, selected from the group consisting of polyolefins (PO), a polyolefin elastomers (POE), polyolefin block co-polymers (OBC), ethylene vinyl acetate copolymers (EVA), EVA/PO copolymers, EVA/OBC copolymers, and combinations thereof such as preferably selected from the group consisting of polyethylenes, polypropylenes, ethylene vinyl acetate copolymers, ethylene/alpha-olefin block co-polymers and combinations thereof a crosslinking peroxide agent and a chemical blowing agent comprising a functionalized particulate bicarbonate, wherein said functionalized particulate bicarbonate comprises an additive containing at least one fatty acid, rosin acid, any derivatives thereof, any salt thereof, or combination thereof.

ITEM 2. The foamable polymer composition according to ITEM 1, wherein said additive in the functionalized particulate bicarbonate comprises or consists of a rosin acid or derivatives thereof, said rosin acid or derivatives thereof comprising abietic acid, dihydroabietic acid, and/or neoabietic acid, a fatty acid such as linoleic acid, lauric acid, oleic acid, linolenic acid, and/or stearic acid, any derivative thereof such as any ester, any salt thereof, or any combinations thereof, preferably comprises a rosin acid or derivatives thereof comprising abietic acid and/or dihydroabietic acid, linoleic acid, any derivative thereof, any salt thereof, or any combinations thereof.

ITEM 3. The foamable polymer composition according to ITEM 1 or 2, wherein the functionalized particulate bicarbonate excludes stearic acid or a stearate salt.

ITEM 4. The foamable polymer composition according to any of the preceding ITEMS, wherein the functionalized particulate bicarbonate further comprises at least one additional additive selected from one or more polymers;

one or more amino acids, any derivative thereof, and salts thereof;

one or more inorganic salts;

one or more oils;

one or more fats;

one or more resin acids, any derivative thereof, and salts thereof;

one or more fatty acids, any derivative thereof, and salts thereof;

a carboxylic or polycarboxylic acid, derivative thereof (such as esters), or salts thereof;

one or more soaps;

one or more waxes; or any combinations thereof;

preferably selected from at least one polymer, more preferably selected from the group consisting of polyoxyalkylenes and derivatives thereof including polyethylene glycols, polypropylene glycols, poly(meth)acrylates and derivatives thereof, polyvinylalcohol, polysaccharides and combinations thereof; and even more preferably selected from the group consisting of polyvinylalcohol and polyoxyalkylenes and derivatives thereof including polyethylene glycols.

ITEM 5. The foamable polymer composition according to any of the preceding ITEMS, wherein the functionalized particulate bicarbonate further comprises a second additive which liberates $CO_2$ upon heating, and wherein said second $CO_2$-liberating compound preferably is at least one of:

fumaric acid, tartaric acid, citric acid, citrates (such as sodium hydrogen citrate, disodium citrate), or esters of citric acid; or combination thereof.

ITEM 6. The foamable polymer composition according to any one of ITEMS 1-5, wherein the chemical blowing agent does not contain an exothermic blowing agent, or wherein the chemical blowing agent does not contain a compound which liberates nitrogen or ammonia gas during heating.

ITEM 7. The foamable polymer composition according to any one of ITEMS 1-5, wherein the chemical blowing agent further comprises an exothermic blowing agent, preferably selected from the group consisting of ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), and TSH (toluene-4-sulfonohydrazide), 5-PT (5-phenyltetrazole), more preferably comprising ADCA.

ITEM 8. The foamable polymer composition according to any of the preceding ITEMS, wherein the functionalized particulate bicarbonate comprises at least 65% by weight and less than 100% by weight of the bicarbonate component, and from 35% or less to 0.02% by weight of at least one of said additive.

ITEM 9. The foamable polymer composition according to any of the preceding ITEMS, wherein the particles of the functionalized particulate bicarbonate have a particle size distribution of $D_{50}$ of more than 1 µm, preferably at least 5 µm, and at most 250 µm, preferably at most 100 µm, more preferably at most 60 µm, yet more preferably at most 40 µm, yet most preferably at most 25 µm.

ITEM 10. The foamable polymer composition according to any of the preceding ITEMS, wherein the functionalized particulate bicarbonate is obtained by at least one of the following processes:

by spray-drying (also known as atomization), wherein the additive is dissolved in the bicarbonate-containing solution.

by grinding or co-grinding (also known as milling or co-milling) of bicarbonate particles with the additive(s) in emulsion or powder form;

by spray coating and granulation of bicarbonate particles within a fluidized bed, by spray agglomeration of bicarbonate particles within a fluidized bed, by spray chilling (e.g., spray cooling, spray freezing) bicarbonate particles, by roller compaction of bicarbonate particles, and/or by extrusion of bicarbonate particles, including simultaneous mixing/extrusion; optionally followed by subjecting the thus obtained functionalized particulate bicarbonate to milling to reduce its mean particle size;

preferably obtained by grinding, extrusion, and/or spray coating bicarbonate particles with the additive(s);

more preferably obtained by grinding and/or extrusion bicarbonate particles with the additive(s).

ITEM 11. The foamable polymer composition according to any of the preceding ITEMS, wherein the functionalized particulate bicarbonate is obtained by grinding, extrusion, and/or spray coating bicarbonate particles with the additive (s), preferably by grinding and/or extrusion bicarbonate particles with the additive(s);

optionally followed by subjecting the thus obtained functionalized particulate bicarbonate to milling to reduce its mean particle size.

ITEM 12. The foamable polymer composition according to any of the preceding ITEMS, wherein the chemical blowing agent further comprises a second compound which liberates $CO_2$ upon heating, said second $CO_2$-liberating compound being selected from the group consisting of a carboxylic or polycarboxylic acid, derivative thereof (such as esters), or salts thereof, wherein said second $CO_2$-liberating compound optionally is optionally functionalized with at least one additive which is different or the same as the one in the functionalized particulate bicarbonate, preferably the same additive, and wherein said second $CO_2$-liberating compound preferably is at least one of:

fumaric acid,
tartaric acid,
citric acid, citrates (such as sodium hydrogen citrate, disodium citrate), or esters of citric acid; or combination thereof.

ITEM 13. The foamable polymer composition according to any of the ITEMS 1-11, wherein the functionalized particulate bicarbonate or the chemical blowing agent comprising the functionalized particulate bicarbonate excludes citric acid, esters thereof, or salts thereof (such as citrates).

ITEM 14. The foamable polymer composition according to any of the preceding ITEMS, further comprising at least a component selected from the group consisting of stability control agents, nucleating agents, fillers, pigments, antioxidants, acid scavengers, UV stabilizers, flame retardants, lubricants, processing aids, extrusion aids, blowing agent activators, dyes, and combinations thereof.

ITEM 15. The foamable polymer composition according to any of the preceding ITEMS, excluding a blowing agent activator, such as an ADCA kicker containing zinc, preferably excluding ZnO.

ITEM 16. The foamable polymer composition according to any of the preceding ITEMS, wherein the functionalized particulate bicarbonate further comprises silica, preferably comprises amorphous silica, more preferably comprises amorphous precipitated silica.

ITEM 17. The foamable polymer composition according to any of the preceding ITEMS, wherein the crosslinking peroxide agent is an organic peroxide, preferably dicumyl peroxide or bis(tert-butyldioxyisopropyl)benzene.

ITEM 18. The foamable polymer composition according to any of the preceding ITEMS, wherein the crosslinkable polymer is selected from the group consisting of polyolefins (PO), ethylene vinyl acetate copolymers (EVA), and EVA/PO copolymers, preferably selected from the group consisting of polyethylenes, polypropylenes, ethylene vinyl acetate copolymers, EVA/polyethylenes, EVA/polypropylenes, and any combinations thereof.

ITEM 19. The foamable polymer composition according to any of the preceding ITEMS, comprising from 1.5% to 6% by weight of the functionalized particulate bicarbonate.

ITEM 20. The foamable polymer composition according to any of the preceding ITEMS, wherein the functionalized particulate bicarbonate is characterized by a TGA maximum loss temperature or a DSC maximum peak temperature of at least 145° C., preferably of at least 150° C.

ITEM 21. The foamable polymer composition according to any of the preceding ITEMS, wherein the functionalized particulate bicarbonate is characterized by a TGA maximum loss temperature or a DSC maximum peak temperature at least 5° C. greater, preferably at least 10° C. greater, than a not-functionalized particulate bicarbonate.

ITEM 22. The foamable polymer composition according to any of the preceding ITEMS, wherein the functionalized particulate bicarbonate is characterized by a TGA maximum loss temperature or a DSC maximum peak temperature at least 5° C. greater, preferably at least 10° C. greater, than a mixture of a not-functionalized particulate sodium bicarbonate and citric acid or a citrate salt.

ITEM 23. The foamable polymer composition according to any of the preceding ITEMS, wherein the functionalized particulate bicarbonate is characterized by a single decomposition peak in TGA or DSC analysis.

ITEM 24. The foamable polymer composition according to any of the preceding ITEMS, wherein the functionalized sodium bicarbonate has an activation temperature which is lower than ADCA and/or greater than a mixture of a not-functionalized particulate sodium bicarbonate and citric acid or a citrate salt.

ITEM 25. A process for manufacturing a foamed crosslinked polymer, preferably wherein the foamed crosslinked polymer is selected from the group consisting of EVA, crosslinked polyolefins (XLPO), a crosslinked polyolefin block co-polymers (OBC), a EVA/PO copolymers, and EVA/OBC copolymers, more preferably selected from the group consisting of EVA, crosslinked polyolefins (XLPO), and crosslinked EVA/PO copolymers, the process comprising:
heating the foamable polymer composition according to any of ITEMS 1 to 24 which comprises the functionalized particulate bicarbonate, in a mold at a temperature suitable for liberating $CO_2$ gas, melting and crosslinking the crosslinkable polymer with sais crosslinking peroxide agent to form a crosslinked polymer during a predetermined time from 4 minutes to 10 minutes, preferably from 4 to 7 minutes, and
opening the mold resulting in expanding the crosslinked polymer to form a foamed crosslinked polymer.

ITEM 26. The process for manufacturing a foamed crosslinked polymer according to ITEM 25, wherein said temperature is at or above glass transition temperature Tg and/or above melting temperature Tm of the crosslinkable polymer.

ITEM 27. The process for manufacturing a foamed crosslinked polymer according to ITEM 25 or 26, wherein the predetermined time with the foamable polymer composition comprising the functionalized bicarbonate is less than that with a foamable polymer composition containing the same polymer, the same crosslinking compound but with ADCA with an ADCA kicker such as ZnO to obtain a foamed polymer.

ITEM 28. The process for manufacturing a foamed crosslinked polymer according to any of the ITEMS 25-27, further comprising
cryo-milling or calendaring the foamable polymer composition prior to heating,
wherein said heating the foamable polymer composition is carried out at a temperature from about 180° C. to 190° C., for a predetermined time from 4 minutes to 10 minutes, either in a furnace of an injection molder before injecting the foamable composition into the mold for injection molding or in the mold for compression molding; and
wherein after such heating, opening the mold causes expansion of the crosslinked polymer.

ITEM 29. The process for manufacturing a foamed crosslinked polymer according to ITEM 28, further comprising
cooling the foamed crosslinked polymer, preferably to room temperature without applying any cooling device or cooling method.

ITEM 30. A foamed crosslinked polymer obtained by the process of any of the ITEMS 25-29, wherein the foamed crosslinked polymer is selected from the group consisting of EVA, POE, crosslinked polyolefins (XLPO), a crosslinked polyolefin block co-polymers (OBC), crosslinked EVA/PO copolymers, and crosslinked EVA/OBC copolymers, preferably selected from the group consisting of EVA, crosslinked polyolefins (XLPO), and crosslinked EVA/PO copolymers.

ITEM 31. The foamed crosslinked polymer according to ITEM 30 characterized by cell size equal or below 250 μm; and wherein the cell size distribution is bimodal with few large cells (from 200 to 250 μm) and a large number of small cells (from 50 to 100 μm).

ITEM 32. The foamed crosslinked polymer according to ITEM 30 or 31, being used for footwear applications such as shoe or sole, or for automotive applications.

EXAMPLES

The following examples are given by way of non-limiting illustration of the present invention, and variations thereof that are readily accessible to a person skilled in the art.

The following chemicals were used in the examples:
Linoleic acid from Sigma-Aldrich
Resigral® 5 (containing at least 52 wt % dihydroabietic acid) from Les Derives Resiniques et Terpeniques (DRT)
Tixosil® 38AB precipitated silica from Rhodia (Solvay group)

Example 1

Functionalized Sodium Bicarbonate Blowing Agent ('FB-BA')
1.1 FB-BA Composition & Characteristics
TABLE 1 summarizes the chemical composition of the functionalized bicarbonate blowing agents 'FB-BA' that were used in the manufacture of EVA and crosslinked olefins and provides particle size distribution such as D10, D50, D90, Span.

The $D_{50}$ term is designating the diameter for which 50% by weight of the particles have a diameter less than or equal to $D_{50}$ (weight average diameter). The $D_{10}$ term is designating the diameter for which 10% by weight of the particles have a diameter less than or equal to $D_{10}$. The $D_{90}$ term is designating the diameter for which 90% by weight of the particles have a diameter less or equal to $D_{90}$. The span of the particle size distribution is as known in the art defined as the ratio $(D_{90}-D_{10})/D_{50}$.

The weight-average diameter $D_{50}$, as well as $D_{10}$ and $D_{90}$ values were measured by laser diffraction and scattering on a Malvern Mastersizer S particle size analyser using an He—Ne laser source having a wavelength of 632.8 nm and a diameter of 18 mm, a measurement cell equipped with a backscatter 300 mm lens (300 RF), and MS 17 liquid preparation unit, and an automatic solvent filtration kit ("ethanol kit") using ethanol saturated with bicarbonate (wet method). The span was calculated from the measured values: $D_{10}$, $D_{50}$ and $D_{90}$.

TABLE 2 summarizes thermal analysis of the chemical blowing agents: TGA maximum loss temperature and DSC maximum peak temperature) for the FB-BA samples, one comparative (not functionalized) technical-grade sodium bicarbonate product Bicar® 0/4 AD by Solvay, a benchmark endothermic sodium bicarbonate based blowing agent Hydrocerol® by Clariant, and ADCA.

Thermogravimetric analysis (TGA) is a method of thermal analysis in which the weight of a sample is measured over time as the sample is heated at a constant rate, in this case heated from 35 to 250° C. at a rate of 10° C./min, under nitrogen flow. This measurement provides information about the decomposition temperature of the chemical blowing agent and the release of gas generated by such decomposition. The TGA maximum weight loss temperature is the temperature at which the sample weight is decomposed.

Differential scanning calorimetry (DSC) is a thermoanalytical technique which is widely used for examining polymeric materials to determine their thermal transitions. A DSC graph is used to measure a number of characteristic properties of a sample such as the maximum peak temperature which represents the maximum rate of phase transformation. In this analysis, the DSC were performed under nitrogen flow, at 10° C./min from 35 to 250° C.

TABLE 1

| Samples | Sodium bicarbonate weight content in 'FB-BA' | Functionalization/other additive(s) weight content in 'FB-BA' | D10 (μm) | D50 (μm) | D90 (μm) | Span (μm) |
| --- | --- | --- | --- | --- | --- | --- |
| (FB-BA) 1 | 95% | 5% Linoleic acid | 5.7 | 17.7 | 37.7 | 1.8 |
| (FB-BA) 2 | 90% | 9% Resigral ® 52 + 1% Tixosil ® 38AB | 1.7 | 9 | 21 | 2.1 |
| (FB-BA) 3 | 98% | 2% Resigral ® 52 | 3 | 15.2 | 32.4 | 1.93 |
| (FB-BA) 4 | 90% | 10% Linoleic acid | 3.6 | 13 | 25 | 1.6 |
| Bicar ® 0/4 AD | 100% | — | — | — | 46 | — |

TABLE 2

| Samples | TGA max. loss temp. ° C. | DSC max. peak temp. ° C. |
| --- | --- | --- |
| (FB-BA) 1 | 176 | 180 |
| (FB-BA) 2 | 169 | 174 |
| (FB-BA) 3 | 155 | 163 |
| (FB-BA) 4 | 174 | 179 |
| Hydrocerol ® BIH | 142 | — |
| Bicar ® 0/4 AD | 138 | 148 |
| ADCA | 225 | — |

To be noted, all of the TGA graphs had only one peak for the decomposition of the functionalized sodium bicarbonate (FB-BA) samples as well as the unfunctionalized sodium bicarbonate reference Bicar® 0/4 AD.

The EVA polymer used in the examples had a TGA maximum loss temperature of 193° C.

The activation temperatures of the functionalized sodium bicarbonate (FB-BA) were lower than that of ADCA. This may allow the reduction of the process temperature or an improvement of cycle times under certain conditions.

1.2 Method of Preparation of the Functionalized Sodium Bicarbonate (FB-BA) Samples The samples of functionalized sodium bicarbonate were prepared by co-grinding (co-milling) sodium bicarbonate particles each with different additives: 5 wt % linoleic acid for Example (FB-BA) 1; 9% Resigral® 52 (≥52 wt % dehydroabietic acid)+1% Tixosil® 38AB (silica) for Example (FB-BA) 2; and 2% Resigral® 52 for Example (FB-BA) 3; and 10 wt % linoleic acid for Example (FB-BA) 4.

1.2.1 Preparation for (FB-BA) 1

Milling was performed continuously in an Alpine UPZ 700 Ultraplex Fine Impact Mill by grinding 200 g of sodium bicarbonate particles Bicar® TEC 0/3 (manufactured by SOLVAY) with linoleic acid to reach 5 wt % linoleic acid in the sample (FB-BA) 1.

1.2.2 Preparation for (FB-BA) 2

Milling was performed continuously in an MG40 milling unit by grinding 76.5 kg of sodium bicarbonate particles Bicar® TEC 0/13 (manufactured by SOLVAY) with Resigral®52 and Tixosil® 38AB to reach 9 wt % Resigral®52 and 1 wt % silica in the sample (FB-BA) 2.

1.2.3 Preparation for (FB-BA) 3

Milling was performed continuously in an UltraRotor III CS instrument from Jackering, equipped with a classifier. A mass of 6.8 kg of sodium bicarbonate particles (Bicar® TEC 0/3 manufactured by SOLVAY) was loaded at the bottom of the mill from 10 to 300 kg/h under air injection at room temperature. The functionalization additive Resigral®52 was added at the mid level of the mill in order to reach 2% Resigral® 52 in the sample (FB-BA) 3. Mill rotary speed and classifier rotary speed were selected to reach the desired particle size distribution.

1.2.4 Preparation for (FB-BA) 4

The sample (FB-BA) 4 was prepared by milling 100 kg of sodium bicarbonate particles Bicar® TEC 0/13 (manufactured by SOLVAY) with linoleic acid in a similar manner as sample (FB-BA) 3 in the UltraRotor III CS instrument in order to reach 10% linoleic acid.

Example 2

Making EVA foams using a functionalized bicarbonate and characterization of the EVA foams 2.1 Preparation of an EVA Foam by Injection Molding The ingredients of a foamable composition containing EVA were blended together using a batch mixer as a kneader (Brabender®) at 70° C., 60 rpm for 15 minutes. The foamable composition was cryo-milled (using liquid nitrogen) or calendared (T=40° C.). The foamable composition was introduced in the furnace of a lab-scale micro-injection molder (Xplore) at 100° C. for 5 minutes to soften the material before molding.

The foamable composition was injected into a mold at about 180° C. or 190° C., under two pressure conditions (pressure condition 1=1 bar for 1 minute or pressure condition 2=3 bars for 2 minutes) for a predetermined time (10 minutes was used for FB-BA 1; 7 minutes was used for the other blowing agents such as FB-BA 2, 4, 3, some sodium bicarbonate reference products and ADCA). The mold geometry was 80×10×4 mm (length×width×thickness). After the predetermined time, the mold was opened and the EVA expanded due to the pressure drop. The samples were cooled down to room temperature without applying any cooling device or cooling method.

2.2 Preparation of the EVA Foam by Compression Molding and for the Blowing Kinetic Study The ingredients of the foamable composition containing EVA were blended together in a roll mill @ 100° C. The foamable composition (mass of 3.5-3.6 g) was introduced in a cylindrical mold (21 mm in diameter and 11.6 mm in thickness). The mold was placed in a two hot-plates press preheated at 178° C. for 7 minutes for regular testing. For the kinetic study, the foamable composition inside the mold was foamed using different foaming times (from 2-3 to 9 min). After the desired time, the pressure was released and the foamed article was extracted from the mold. The samples were cooled down to room temperature without applying any cooling device or cooling method. The results are provided in Section 2.5.6 Impact of the foaming time on foam density.

2.3 Foamable EVA Compositions

An EVA precursor mixture was generally used to make foamable EVA compositions. To this EVA precursor mixture, the chemical blowing agent was added.

One EVA precursor mixture "A" without blowing agent contained EVA polymer, peroxide and kicker (ZnO). Another EVA precursor mixture "B" without blowing agent contained EVA polymer, peroxide, but no kicker (ZnO). TABLE 3 & TABLE 4 summarize the EVA precursor mixtures "A" and "B" respectively.

TABLE 3

| EVA precursor mixture "A" | |
|---|---|
| Ingredients | Weight content |
| EVA | 70-95% |
| Peroxide | 0.5-4% |
| Kicker (ZnO) | 0.5-1% |

TABLE 4

| EVA precursor mixture "B" | |
|---|---|
| Ingredients | Weight content |
| EVA | 70-95% |
| Peroxide | 0.5-4% |

In order to produce an EVA foam, one or more chemical blowing agents (such as ADCA or at least one functionalized sodium bicarbonate) was added to an EVA precursor mixture during the kneading step in Brabender as described in section 2.1. The content of the blowing agent depended on its nature 1.5 or 2 wt % for ADCA and from 3.5 to 5.5 wt % for FB-BAs. A preferred content of FB-BA in the foamable composition was 4.5 wt %. When commercially-available sodium bicarbonate reference products were used for reference, a preferred content of these products in the foamable composition was 4.5 wt %. TABLE 5 provides EVA foamable compositions made by mixing ADCA in the EVA precursor mixture "A" for comparative examples not in accordance to the invention.

TABLE 5

EVA foamable compositions 1 with ADCA with ZnO kicker

| Ingredients | Weight content (%) in foamable composition | |
|---|---|---|
| EVA precursor mixture "A" | 98.5% | 98% |
| ADCA | 1.5% | 2% |

TABLES 6 & 7 provide an EVA foamable composition made by mixing the functionalized bicarbonate blowing agent in the EVA precursor mixtures "A" and "B", respectively, in accordance to the invention.

TABLE 6

EVA foamable composition 2 with FB-BA with ZnO kicker

| Ingredients | Weight content (%) in foamable composition |
|---|---|
| EVA precursor mixture "A" | 95.5% |
| FB-BA | 4.5% |

TABLE 7

EVA foamable composition 3 with FB-BA without ZnO kicker

| Ingredients | Weight content (%) in foamable composition |
|---|---|
| EVA precursor mixture "B" | 95.5% |
| FB-BA | 4.5% |

TABLE 8 provides an EVA foamable composition made by mixing two functionalized bicarbonate blowing agents in the EVA precursor mixture "B", in accordance to the invention.

TABLE 8

EVA foamable composition 4 with two FB-BAs without ZnO kicker

| Ingredients | Weight content (%) in foamable composition |
|---|---|
| EVA precursor mixture "B" | 95.5% |
| FB-BA 1 | 2.25% |
| FB-BA 2 | 2.25% |

2.4 Foam Characterizations

The foam geometry was measured using a digital caliper (average of the 3 values for each dimensions) giving the possibility to calculate the foam density "ρ foam" (g/cm³) and the volumetric expansion ratio "ER".

$$\rho \text{ foam} = \frac{m \text{ foam}}{V \text{ foam}}$$

$$ER = \frac{1}{\rho \text{ relative}} = \frac{\rho \text{ solid}}{\rho \text{ foam}}$$

where "m foam" means the mass of the foam sample; "V foam" means the volume of the foam; the "ρ foam" means the foam density; and the "ρ solid" means the density of the respective base non-foamed solid material.

The polymer hardness was measured following the Shore A standard (ISO 868:2003: *"Plastics and ebonite—Determination of indentation hardness by means of a durometer (Shore hardness)"*, a method for the determination of the indentation hardness of plastics and ebonite by means of durometers of two types: type A used for softer materials and type D for harder materials. The method can permit measurement either of the initial indentation or of the indentation after a specified period of time, or both). The durometer of type A was used in the measurements.

The optical microscopy was performed using a Zeiss microscope equipped with an Axio ZoomV16 (with lateral reflection lighting, 150 W halogen source) after cutting of the sample using a cutter.

2.5 Results for EVA Foams Made Using a Single Functionalized Bicarbonate 2.5.1 Results Using a Single Functionalized Bicarbonate (Using Injection Molding, Under Pressure Condition 1)

EVA foams were produced as described in the section 2.1. The morphological and mechanical properties of the foams made with various samples of FB-BAs were compared to the EVA foam made with ADCA.

Additionally, two commercially-available sodium bicarbonate based products: Bicar®0/4 AD manufactured by SOLVAY and Hydrocerol® BIH (blowing agent available from Clariant Corporation) were used in the same manner as described in Section 2.1 for a benchmark compared to the FB-BA samples; these were based on EVA foamable composition 2 (see TABLE 6).

Generally, two EVA foam specimens of each foamable composition with the blowing agents were prepared and a good reproducibility in the results was achieved.

TABLE 9 provides the foam density, expansion ratio and the hardness (Shore A) for resulting EVA foams using pressure condition 1 (1 bar; 1 min) and mold temperature of 180° C. or 190° C. when using the samples:
- with 2 wt % ADCA in foamable Composition 1 (with ZnO) and
- with 4.5 wt % of FB-BA samples or commercial sodium bicarbonate-based products in foamable Composition 2 (with ZnO).

TABLE 9

| Foaming agents (wt % in foamable composition) | Foam Density (g/cm³) | | Expansion Ratio (volumetrically) | | Hardness (Shore A) | |
|---|---|---|---|---|---|---|
| | 180° C. | 190° C. | 180° C. | 190° C. | 180° C. | 190° C. |
| ADCA (2%) | 0.25 | — | 3.90 | — | 31 | — |
| (not according to invention) | 0.26 | — | 3.77 | — | 32 | — |
| | 0.26 | — | 3.78 | — | 33 | — |
| FB-BA 1 (4.5%) | 0.38 | 0.33 | 2.62 | 3.01 | 41 | 39 |
| FB-BA 2 (4.5%) | 0.33 | 0.30 | 3.03 | 3.28 | 37 | 37 |
| | 0.32 | 0.30 | 3.08 | 3.32 | 37 | — |
| Bicar ® 0/4 AD (4.5%) (not according to invention) | 0.35 | 0.33 | 2.79 | 3.01 | 40 | 38 |

TABLE 9-continued

| Foaming agents (wt % in foamable composition) | Foam Density (g/cm³) 180° C. | 190° C. | Expansion Ratio (volumetrically) 180° C. | 190° C. | Hardness (Shore A) 180° C. | 190° C. |
|---|---|---|---|---|---|---|
| Hydrocerol ® BIF (4.5%) (not according to invention) | 0.35 | 0.32 | 2.80 | 3.12 | 38 | — |

Figure 2:
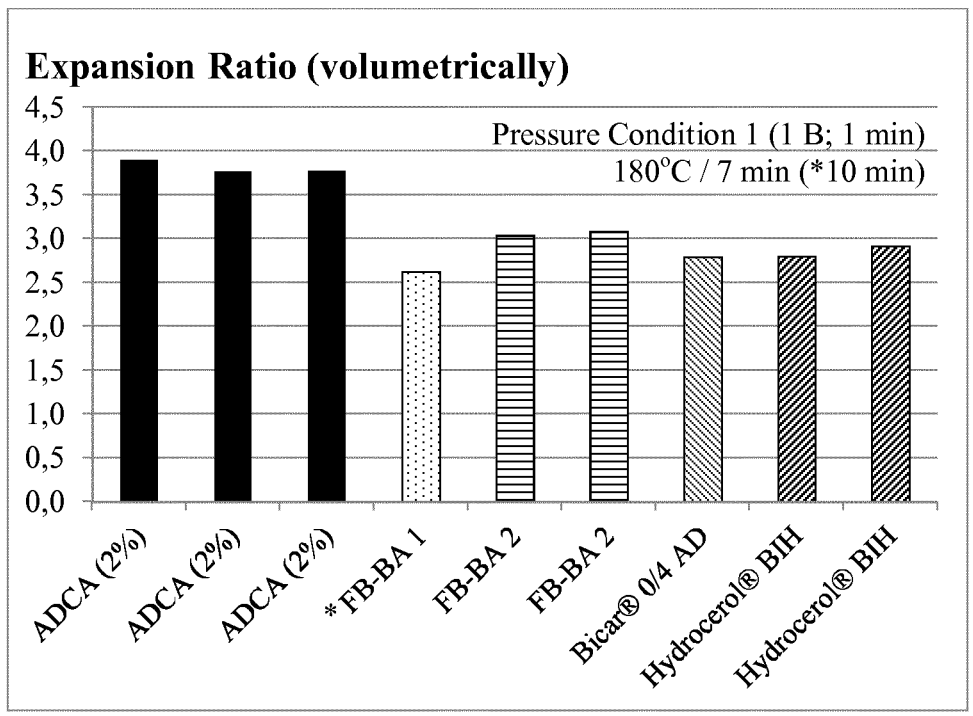

FIG. 1 and FIG. 2 illustrate the foam density and the volumetric expansion ratio, respectively, of the EVA foams produced at 180° C. (mold temperature) in injection molding using different FB-BA samples, ADCA samples, and commercial sodium bicarbonate products at pressure condition 1 (1 bar for 1 min).

The comparative EVA foam produced with 2 wt % of ADCA presented a density of 0.26 g/cm³ and an expansion ratio of 3.82 (avg.). The densities of the foams produced with 2 types of FB-BA samples were in the range 0.32 to 0.38 g/cm³ below the comparative EVA foam, with the lower density achieved with the FB-BA 2 (9% Resigral 52+1% Silica). Similar foam densities (0.35 g/cm³) were achieved with the benchmark commercial sodium-based bicarbonate products.

In addition, the hardness of the EVA foam was higher when using the FB-BA samples and commercial sodium bicarbonate-based products compared to when using ADCA.

Figure 3:
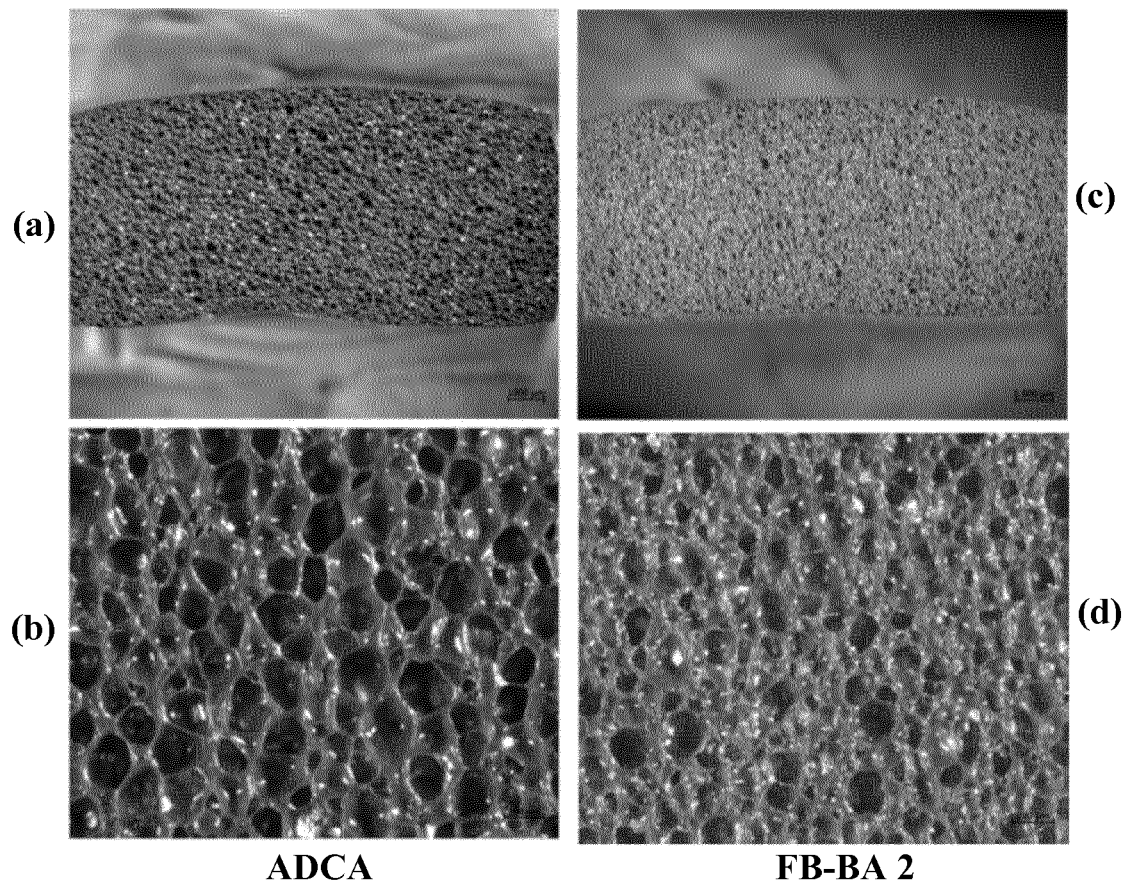
FIG. 3 provides photographs obtained by optical microscopy of EVA foams produced at a molding temperature of about 180° C. during 7 minutes in injection molding with two blowing agents: ADCA (left-end side, FIGS. 3a and 3b) and a functionalized bicarbonate (right-end side, FIGS. 3c and 3d).

FIG. 3 provides photographs obtained by optical microscopy of EVA foams produced at a molding temperature of about 180° C. during 7 minutes inside the mold with two blowing agents: 2 wt % ADCA (left-end side, FIGS. 3a and 3b) and 4.5 wt % FB-BA 2 (right-end side, FIGS. 3c and 3d) whose mechanical properties are provided in TABLE 9. The magnifications were at 1000 µm for FIG. 3a & FIG. 3c (top photographs) and at 200 µm for FIG. 3b & FIG. 3d (bottom photographs). These photographs were taken in the direction transversal to the injection flow.

As observed on the photographs obtained in optical microscopy in FIG. 3, the cell structure of the foam produced with the FB-BA 2 blowing agent was different than the one produced with ADCA:
Both were closed-cells foams
The cell size distribution of the ADCA-blown foam was rather homogeneous; most of the cells had a diameter of 200 µm and the number of small cell (≈50 µm) was limited.
The foams produced with FB-BA 2 were characterized by cell size equal or below 200 µm; and the cell size distribution was bimodal with few large cells and a large number of small cells (≈50 µm).

Thus the cell size distribution of foams produced with FB-BA 2 was bimodal with the majority of the cell sizes being smaller than what is obtained with the ADCA.

2.5.2 Impact of the Mold Temperature on FB-BA Performance (Injection Molding, Pressure Condition 1)

Figure 4:
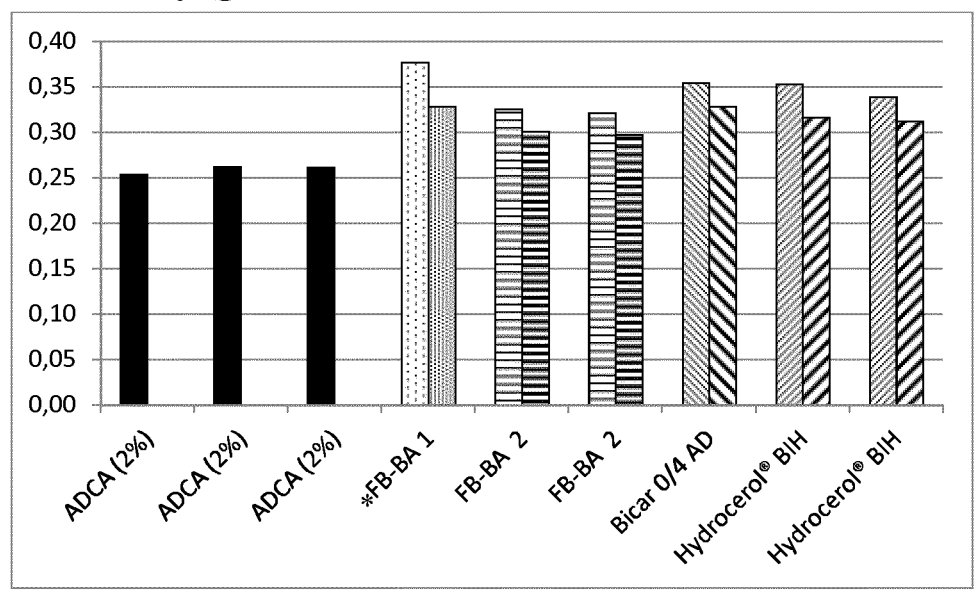
FIG. 4 and FIG. 5 compare the foam density and the volumetric expansion ratio, respectively, of the EVA foams produced at 180° C. and 190° C. (mold temperature) in injection molding using different functionalized bicarbonate samples and commercial sodium bicarbonate products at pressure condition 1 (1 bar for 1 min) compared to those obtained with ADCA at 180° C.
Figure 5:
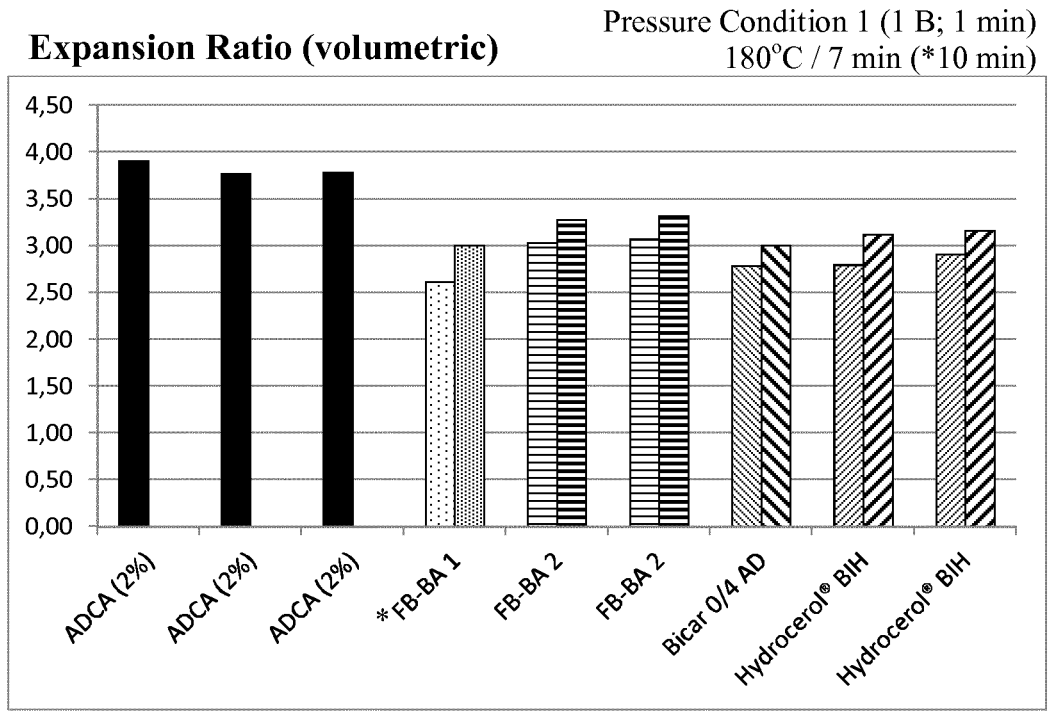

To evaluate the impact of the foaming temperature on the properties of the foams obtained with FB-BA, the injection temperature was raised to 190° C. (instead of 180° C.), in pressure conditions 1. As shown on TABLE 9, the increase of the temperature decreased the foam density (about 10%), depending on the FB-BA blowing agent used. FIG. 4 and FIG. 5 compare the foam density and the volumetric expansion ratio, respectively, of the EVA foams produced at 180° C. and 190° C. (mold temperature) in injection molding using different FB-BA samples and commercial sodium bicarbonate products at pressure condition 1 (1 bar for 1 min) compared to those obtained with ADCA at 180° C.

2.5.3 Results Using a Single Functionalized Bicarbonate Under Pressure Condition 2 (Injection Molding)

The amount of ADCA in the foamable composition 1 was generally 1.5 wt % ADCA for optimum performance (and not 2 wt % ADCA as in previous section 2.5.1). For that reason, in the tests under this section 2.5.3 using the higher pressure condition 2 (3 bars for 2 min.), the lower ADCA content of 1.5 wt % was used.

TABLE 10 provides the foam density, the expansion ratio and the hardness (Shore A) for resulting EVA foams using pressure condition 2 (3 bars; 2 min) and mold temperature of 180° C. when using the samples:
with 1.5 wt % ADCA in foamable Composition 1 (with ZnO);
with 4.5 wt % FB-BAs 2 & 3 in foamable Composition 2 (with ZnO); and
with 4.5 wt % FB-Bas 2 & 4 in foamable Composition 3 (without ZnO).

TABLE 10

| Foaming agents (wt % in foamable composition) | Foam Density (g/cm³) | Expansion Ratio (volumetrically) | Hardness (Shore A) |
|---|---|---|---|
| ADCA (1.5%) with ZnO (not according to invention) | 0.33 0.33 | 2.97 3.01 | 41 — |
| FB-BA 2 (4.5%) with ZnO | 0.33 0.32 0.33 | 3.03 3.08 2.99 | 37 37 — |
| FB-BA 3 (4.5%) with ZnO | 0.33 0.32 | 3.03 3.07 | 36 37 |
| FB-BA 2 (4.5%) without ZnO | 0.31 0.30 | 3.21 3.24 | 35 35 |
| FB-BA 4 (4.5%) without ZnO | 0.35 0.36 | 2.79 2.77 | — — |

Figure 6:
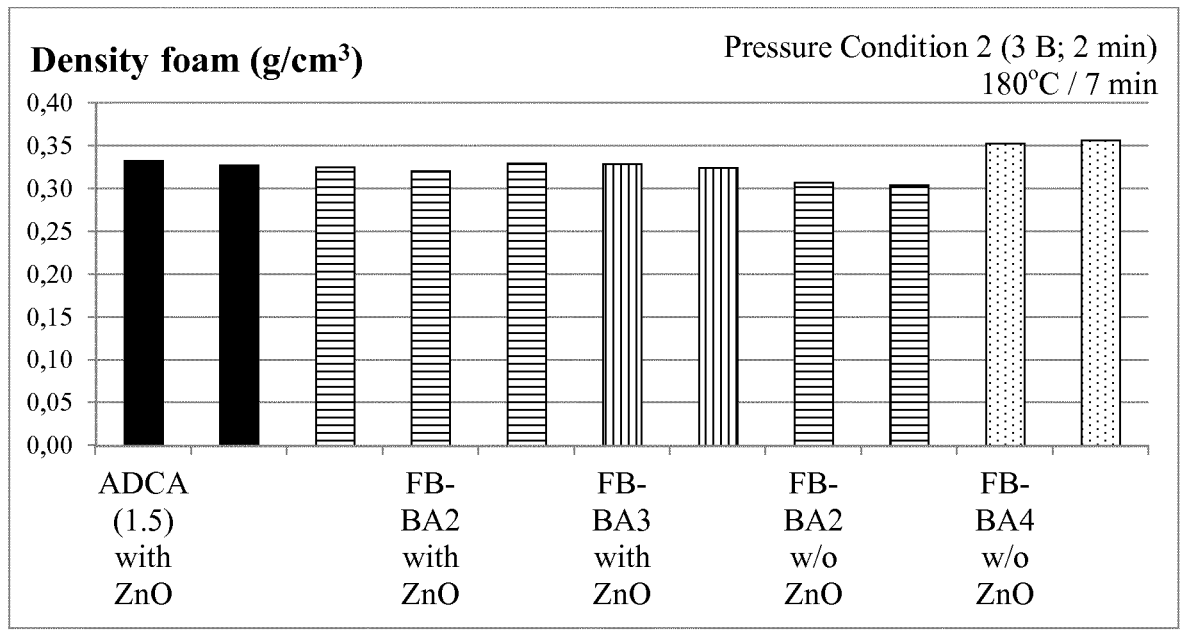
FIG. 6, FIG. 7 and FIG. 8 illustrate the foam density, the volumetric expansion ratio, and the hardness, respectively, of EVA foams produced in injection molding with various functionalized bicarbonate samples with or without ZnO and ADCA with ZnO.

FIG. 6 illustrates the foam density obtained with the various foaming agents listed in TABLE 10. The final density of the foam with FB-BA 2 reached 0.30-0.31 g/cm³ which was the lowest density obtained with 4.5 wt % FB-BA. The FB-BA 3 provided a similar result with a slightly higher density of 0.32-0.33 g/cm³. Both FB-BA 2 & FB-BA 3 provided a foam density less or equal to what was obtained with the ADCA (1.5 wt %). The resulting foam density with the EVA foam samples made with FB-BA 4 were higher than the results obtained with the EVA foam samples made with FB-BAs 2 and 3. It seems that the use of Resigral® 52 (dihydroabietic acid) present in both FB-BAs 2 and 3 was more effective than the use of linoleic acid as functionalization additive for sodium bicarbonate for EVA foaming.

Figure 7:
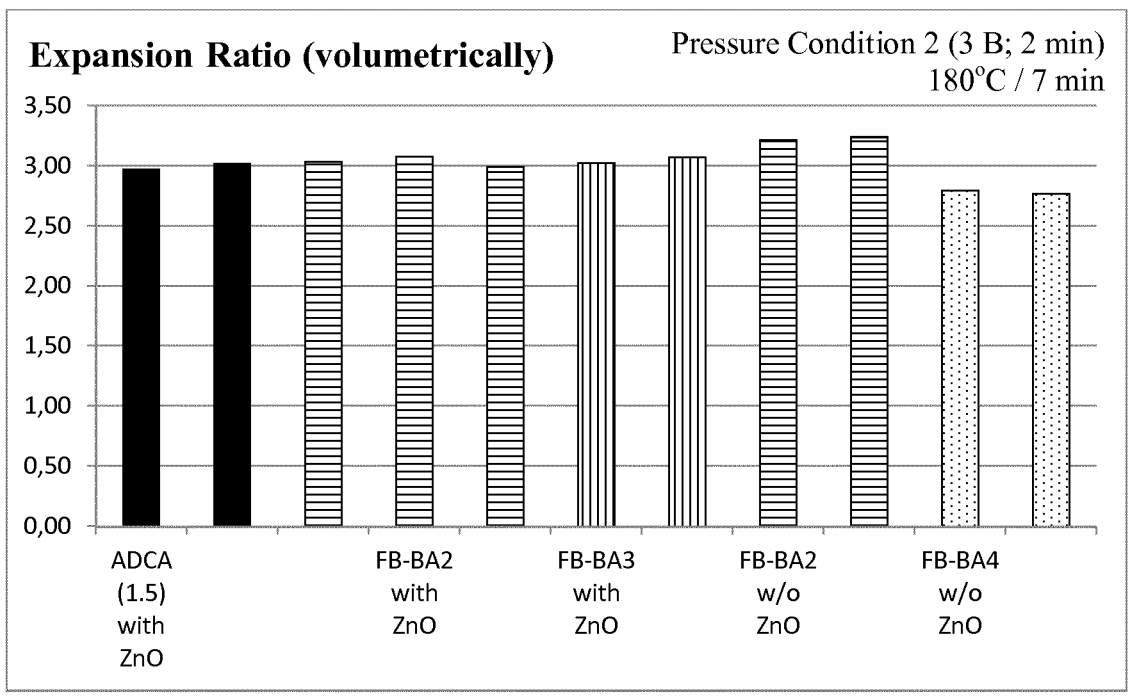

The same trends that the one described for the foam density were observed on the expansion ratio (ER) of the EVA foams. FIG. 7 illustrates the expansion ratio obtained with the various foaming agents listed in TABLE 10. The final expansion ratio of the foams with FB-BA 2 without ZnO reached 3.22 on average which was the highest ER obtained with 4.5 wt % FB-BA. The FB-BA 3 sample provided a slightly lower ER of 3.05 on average. Both FB-BA 2 and FB-BA 3 provided a foam ER higher to what was obtained with the ADCA (ER=2.99 in avg.). The resulting foam ER (=2.78 on average) with the EVA foam samples made with FB-BA 4 was lower than the ER obtained with the EVA foam samples made with FB-BAs 2 and 3.

Under the same process conditions, the FB-BAs were at least as efficient as the market reference (ADCA) in terms of density reduction and expansion ratio.

Figure 8:
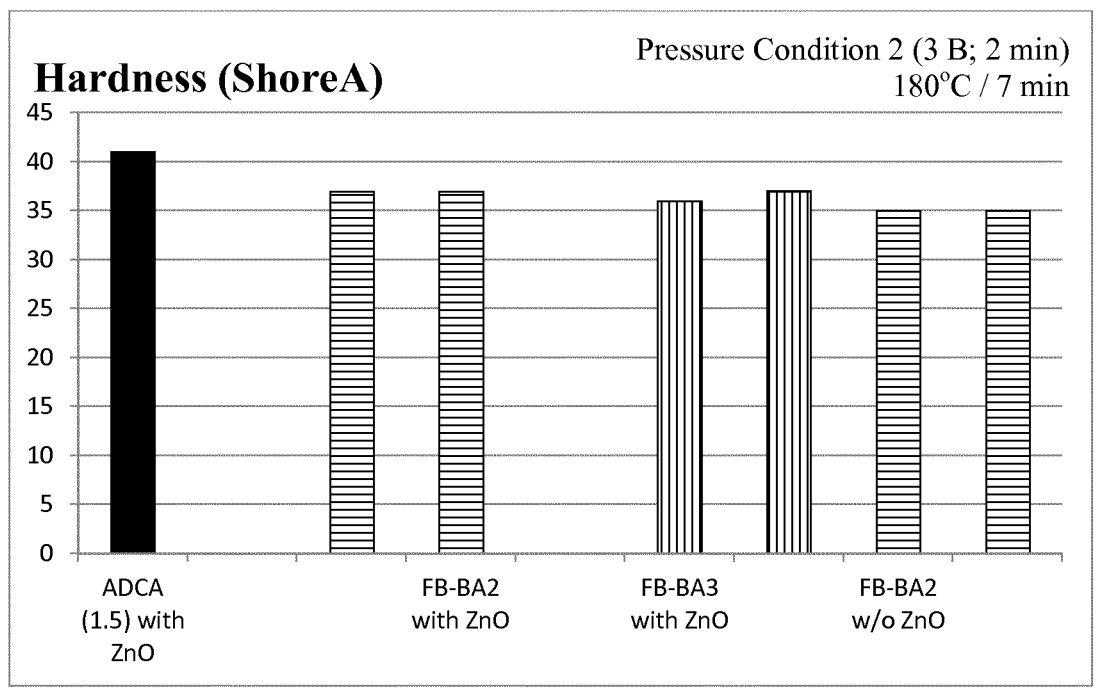

FIG. 8 illustrates the hardness obtained with the various foaming agents listed in TABLE 10. Whatever the conditions used, the foams produced with FB-BAs were harder than the one produced with ADCA. At 180° C., the foams that presented a hardness closest to the one (32) obtained with ADCA were made using FB-BA 2 (35) & FB-BA 3 (36.5), both using Resigral® 52 (dihydroabietic acid) as functionalization additive.

2.5.4 Impact of the ZnO Kicker Addition to FB-BA Performance

Two EVA foams were made with FB-BA 2 with or without ZnO (typically used in about 0.5-1 wt % in EVA foamable compositions using ADCA).

As shown on TABLE 10, the FB-BA 2 without ZnO provided a similar result with a slightly lower foam density of 0.30-0.31 g/cm$^3$ than the density (0.32-0.33 g/cm$^3$) obtained with the FB-BA 2 with ZnO. This is also illustrated in FIG. 6. Since the decomposition temperature of the FB-BA 2 was lower than that of ADCA (see TABLE 2), the use of the ZnO kicker did not provide additional foaming performance to the functionalized bicarbonate. This result highlights that the ZnO can be removed from the EVA foamable composition containing the FB-BA, when the ADCA is not present. Such modification of the foamable composition was not feasible when the ADCA is in the EVA foamable composition. Without kicker, the ADCA decomposed at too high temperature (z 220° C.) compared to the processing temperature of the EVA.

Under similar process conditions, it was confirmed that FB-BA produced a foam without ZnO while ADCA did not.

Adding kickers like ZnO in the foamable formulation when using FB-BA is not required.

In certain cases, improved results in density reduction can be obtained without the use of kickers.

2.5.5 Impact of the FB-BA Concentration on Foam Density

Figure 9:
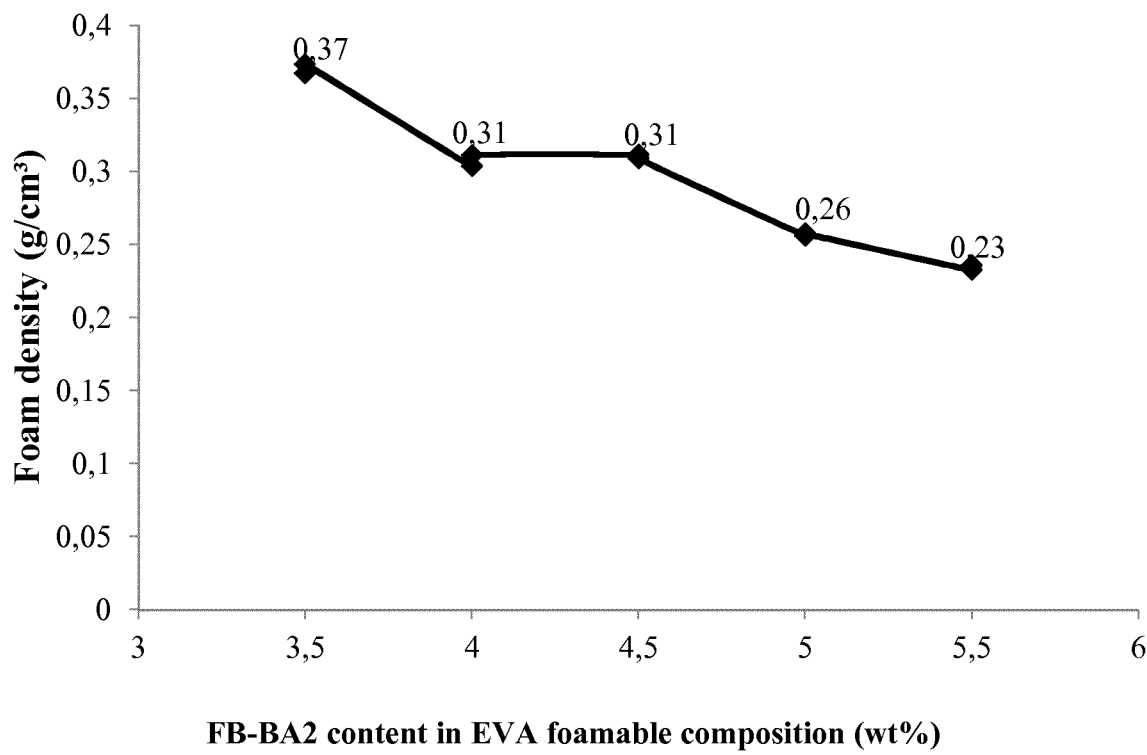
FIG. 9 illustrates the impact of the functionalized bicarbonate content in a foamable EVA composition with respect to the density of the obtained EVA foam.

In the examples of the EVA foams described before, the FB-BA concentration used was 4.5 wt %. In this example, the concentration of the FB-BA 2 sample was varied from 3.5 wt % to 5.5 wt %. As shown on FIG. 9, it was observed that the EVA foam density decreased as the FB-BA 2 concentration increased in the EVA foamable composition. For 5 and 5.5 wt % FB-BA 2, a foam density of 0.26 and 0.23 g/cm$^3$, respectively, was achieved. Such densities were comparable to the foam density produced with 2 wt % of ADCA (0.26 g/cm$^3$, refer to TABLE 9).

Under the same process conditions, the FB-BA was as efficient as the market reference (ADCA) in terms of density reduction of the EVA foam; the density of the EVA foam could be reduced by adding more amount of the FB-BA in the foamable EVA composition.

2.5.6 Impact of the Foaming Time on Foam Density

Figure 10:
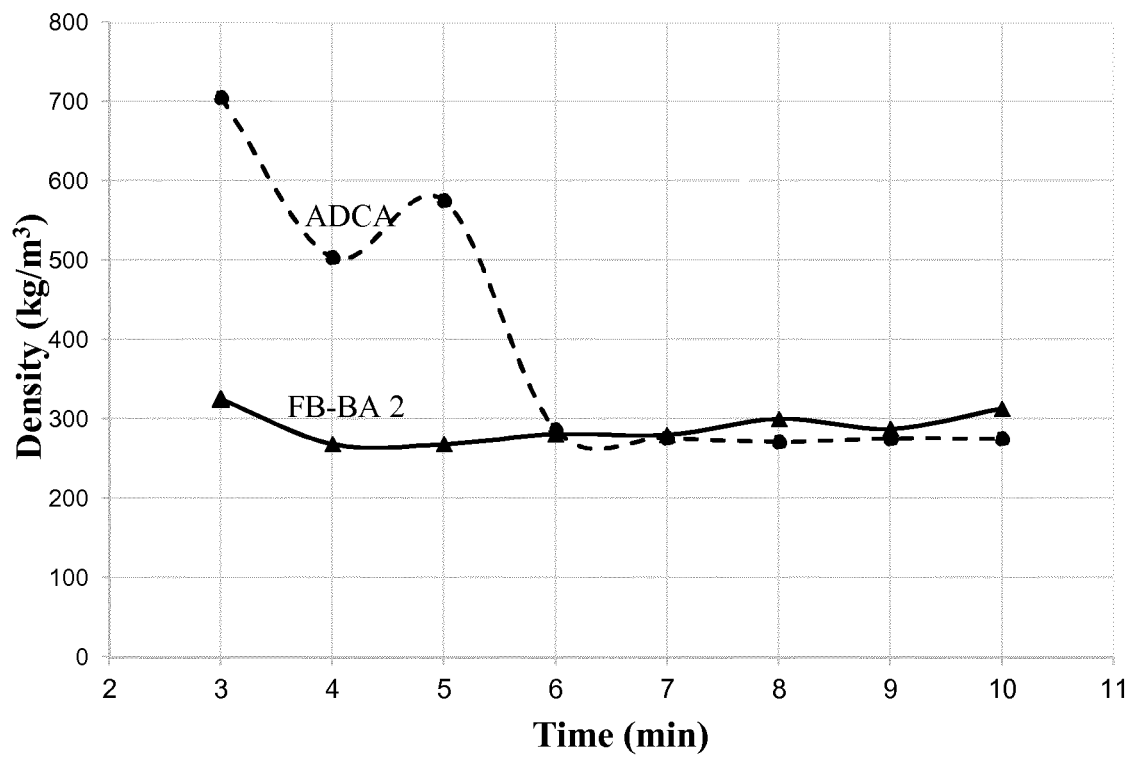
FIG. 10 provides a kinetic study in which the density of an EVA foam made by compression molding is measured as a function of the foaming time from 2 to 10 minutes for EVA foamable formulation containing ADCA and a functionalized bicarbonate sample.

In this kinetic study, the density of the EVA was measured in function of the foaming time from 2 to 10 minutes for EVA foamable formulation containing 1.5 wt % ADCA and 4.5 wt % FB-BA 2 under the conditions (via compression molding) as described earlier in section 2.2. The results are shown on FIG. 10.

There was a significant difference between the density evolution versus time between the ADCA-containing EVA foamable formulation and FB-BA containing EVA foamable formulation. The FB-BA 2 foam was fully expanded after 4 minutes (a decrease from 0.33 to 0.26 g/cm$^3$ from 2 to 4 minutes) to achieve the same density with ADCA that was typically obtained at 7 minutes. On the other end, the foam density with ADCA decreased from 0.7 to 0.29 g/cm$^3$ from 2 to 6 minutes. It was thus shown that the foaming time of the EVA foams can be reduced from 7 minutes (typical for ADCA) to 4 minutes with the FB-BA in the EVA foamable formulation, which provides an advantage for productivity and cost of production.

2.5.7. Impact of the Processing Equipment (Injection Versus Compression Molding)

In this study, the density of the EVA foams prepared with two different processing methods and equipment were compared. Both tested formulations are EVA foamable formulation containing 1.5 wt % ADCA and 4.5 wt % FB-BA 2 under the conditions as described earlier in section 2.3. The comparison is shown in TABLE 11.

These experiments demonstrate that similar foam densities were achieved with these two different processing equipment using the same blowing agent. The density achieved for the foam produced by compression molding were slightly lower than the density achieved for the foam produced by injection molding, whatever the blowing agent used, meaning that the density is more likely linked to the processing conditions than the blowing agent itself.

TABLE 11

| Foaming agents (wt % in foamable composition) | Injection molding Foam Density (g/cm$^3$) | Compression molding Foam Density (g/cm$^3$) |
|---|---|---|
| ADCA (1.5%) with ZnO | 0.33 | 0.28 |
| (not according to invention) | 0.33 | — |
| FB-BA 2 (4.5%) | 0.33 | 0.30 |
| with ZnO | 0.32 | 0.28 |

The cellular structure of the foams produced by these two different molding processes were very similar, whatever the blowing agent used. The cell morphology of the foams produced using injection or compression molding were very close, in that:
- the cell size distribution of the ADCA-blown foam was rather homogeneous; most of the cells had a diameter of 150 μm for compression molding while 200 μm for injection molding; and
- with foam blown with FB-BA 2, the foams were characterized by cell size equal to or less than 200 μm; and the cell size distribution was bimodal with few large cells and a large number of small cells (~50 μm). These results for compression molding were the same as for injection molding—already discussed in the section 2.5.1 (FIG. 3).

2.6 Results for Resulting EVA Foams Using Two Functionalized Bicarbonates

EVA foams were produced as described in the section 2.1 (under pressure condition 1) with various samples using two FB-BAs mixed in with the EVA precursor mixture "B" as shown in TABLE 8. The compositions of the blends of two FB-BAs are shown in TABLE 12 and the composition of FB-BA 2 is again provided in this table.

TABLE 12

EVA foamable compositions 4 with two FB-BAs without ZnO kicker

| Foaming agents | sodium bicarbonate wt % | dehydroabietic acid (Resigral ® 52) wt % | linoleic acid wt % | silica (Tixosil ® 38AB) wt % |
|---|---|---|---|---|
| FB-BA 2 + FB-BA 4 (1:1) | 90 | 4.5 | 5 | 0.5 |
| FB-BA 2 + FB-BA 3 (1:1) | 94 | 5.5 | — | 0.5 |
| FB-BA 2 | 90 | 9 | — | 1 |

Figure 11:
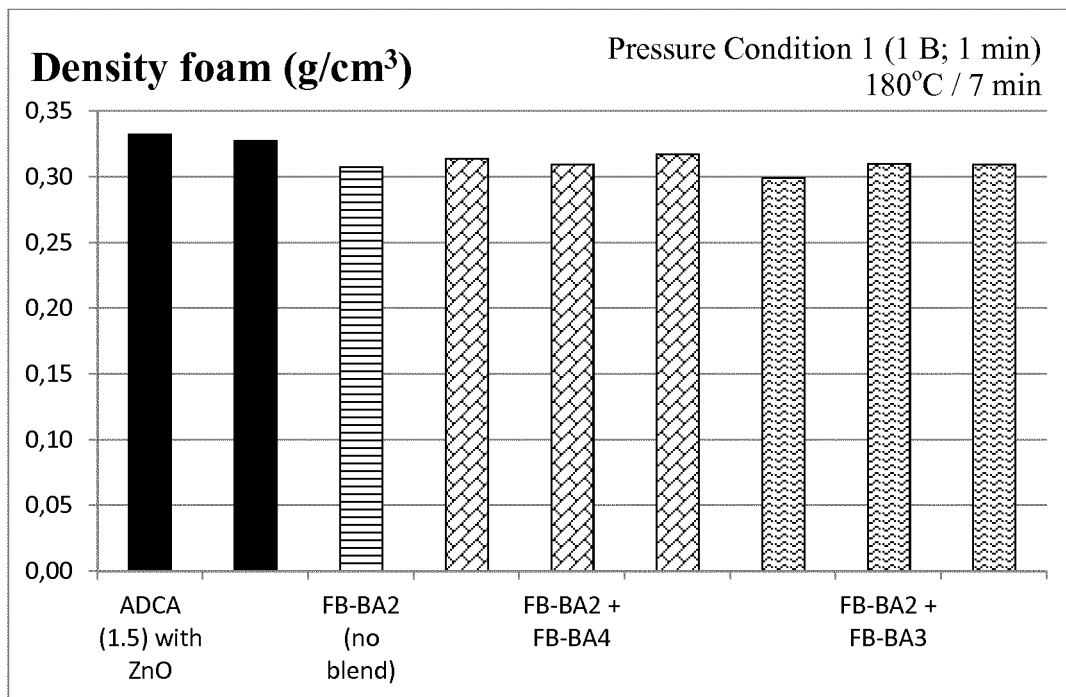
FIG. 11 and FIG. 12 illustrate the foam density and the expansion ratio obtained with blends of functionalized bicarbonate samples compared to ADCA and single functionalized bicarbonate samples.
Figure 12:
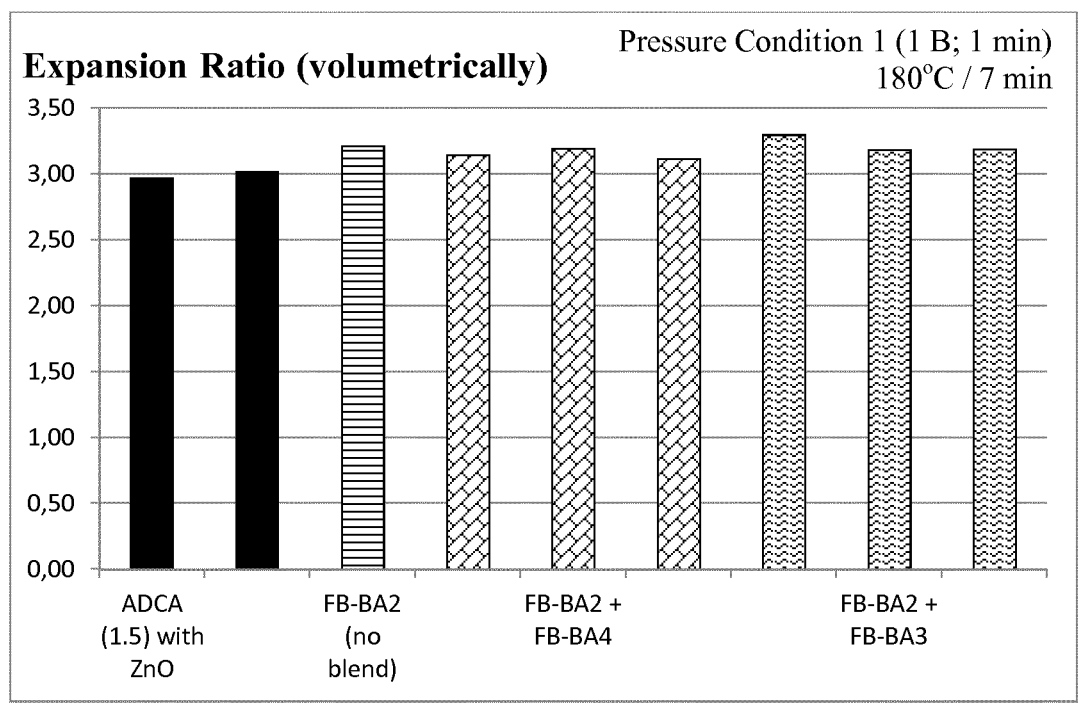

The mechanical properties of these EVA foams were compared to the EVA foam made with ADCA and shown in TABLE 13, and FIGS. 11 and 12 illustrate the foam density and the expansion ratio obtained with the various foaming agents.

TABLE 13

| Foaming agents (wt % in foamable composition) | Foam Density (g/cm³) | Expansion Ratio (volumetrically) | Hardness (Shore A) |
|---|---|---|---|
| ADCA (1.5%) with ZnO (not according to invention) | 0.33 | 2.97 | 41 |
|  | 0.33 | 3.01 | — |
| FB-BA 2 + FB-BA 4 (1:1) | 0.33 | 3.03 | 37 |
|  | 0.32 | 3.08 | 37 |
|  | 0.33 | 2.99 | — |
| FB-BA 2 + FB-BA 3 (1:1) | 0.33 | 3.03 | 36 |
|  | 0.32 | 3.07 | 37 |
| FB-BA 2 | 0.31 | 3.21 | 35 |
|  | 0.30 | 3.24 | 35 |

2.7 Results for Resulting EVA Foam Using a Blend of ADCA and a Functionalized Bicarbonate EVA foams were produced as described in the section 2.2 with a blend of ADCA (2%) and FB-BA 2 (1%); these two blowing agents were mixed into 97 wt % of the foamable composition "A" containing ZnO.

The density of this EVA foam was compared to those of the EVA foams separately made with ADCA (1.5 wt %) and FB-BA 2 (3 & 4.5 wt %) in TABLE 14.

TABLE 14

| Foaming agents (wt % in foamable composition) | Foam Density (g/cm³) |
|---|---|
| ADCA (1.5 wt %) with ZnO (not according to invention) | 0.32 |
| FB-BA 2 (3 wt %) with ZnO | 0.31 |
| FB-BA 2 (4.5 wt %) with ZnO | 0.27 |
| Blend: ADCA (2%) with ZnO + FB-BA 2 (1%) | 0.22 |

Example 3

Making Crosslinked Polyolefin (XLPO) Foams Using a Functionalized Bicarbonate and Characterization of the XLPO Foams 3.1 Preparation of a XLPO Foam The ingredients of a foamable composition containing a polyolefin were blended together using a batch mixer as a kneader (Brabender®) at 90° C., 60 rpm for 15 minutes. The foamable composition was calendared (T=40° C.). The foamable composition was introduced in the furnace of a lab-scale micro-injection molder (Xplore) at 100° C. for 5 minutes to soften the material before molding.

The foamable composition was injected into a mold at about 180° C. or 190° C., under two pressure conditions (pressure condition 1=1 bar for 1 minute) for 7 minutes was used for the blowing agent FB-BA 2 and ADCA). The mold geometry was 80×10×4 mm (length×width×thickness). After the predetermined time, the mold was opened and the XLPO expanded due to the pressure drop. The samples were cooled down to room temperature without applying any cooling device or cooling method.

3.2 Foamable XLPO Compositions

A XLPO precursor mixture "C" was generally used to make foamable XLPO compositions. This XLPO precursor mixture without blowing agent contained a polyolefin polymer and a peroxide. To this XLPO precursor mixture "C", the chemical blowing agent was added. The kicker (ZnO) was added up to 5 wt % to the XLPO precursor mixture "C" when ADCA was used as blowing agent. TABLE 15 summarizes the ingredients of the XLPO precursor mixtures "C".

TABLE 15

XLPO precursor mixture "C"

| Ingredients | Weight content |
|---|---|
| Polyolefin | <99% |
| Peroxide* | >0-6% |

*may be selected for example from dicumyl peroxide or bis(tert-butyldioxyisopropyl) benzene In order to produce a XLPO foam, one or more chemical blowing agents (such as ADCA or at least one functionalized sodium bicarbonate) was added to a XLPO precursor mixture "C" during the kneading step in Brabender as described in section 3.1. The content of the blowing agent depended on its nature: 2 wt % for ADCA and from 3 up to 4.5 wt % in total for FB-BAs.

TABLE 16 provides XLPO foamable compositions made by mixing ADCA in the XLPO precursor mixture "C" for comparative examples not in accordance to the invention.

TABLE 16

XLPO foamable composition 5 with ADCA with ZnO kicker

| Ingredients | Weight content (%) in foamable composition |
|---|---|
| XLPO precursor mixture "C" | 97% |
| ADCA | 2% |
| Kicker (ZnO) | 1% |

TABLE 17 provides a XLPO foamable composition made by mixing the functionalized bicarbonate blowing agent FB-BA 2 in the XLPO precursor mixtures "C" with adding kicker (ZnO) in accordance to the invention.

TABLE 17

| XLPO foamable composition 5 with FB-BA with ZnO kickerIngredients | |
|---|---|
| | Weight content (%) in foamable composition |
| XLPO precursor mixture "C" | 95.5% |
| FB-BA 2 | 4.5% |

TABLES 18 & 19 provide XLPO foamable compositions made by mixing two functionalized bicarbonate blowing agents (FB-BA 2 with either FB-BA 3 or FB-BA 4) in the XLPO precursor mixture "C" without ZnO kicker, in accordance to the invention.

TABLE 18

| Ingredients | Weight content (%) in foamable composition |
|---|---|
| XLPO precursor mixture "C" | 95.5% |
| FB-BA 2 | 2.25% |
| FB-BA 3 | 2.25% |

TABLE 19

| Ingredients | Weight content (%) in foamable composition |
|---|---|
| XLPO precursor mixture "C" | 95.5% |
| FB-BA 2 | 2.25% |
| FB-BA 4 | 2.25% |

3.3 Results for Resulting XLPO Foams Using a Single Functionalized Bicarbonate 3.3.1 Results Using a Single Functionalized Bicarbonate (Under Pressure Condition 1)

XLPO foams were produced as described in the section 3.1. The morphological and mechanical properties of the foams made with various samples of FB-BAs were compared to the XLPO foam made with ADCA.

Generally, two XLPO foam specimens of each foamable composition with the blowing agents were prepared and a good reproducibility in the results was achieved.

TABLE 20 provides the foam density, expansion ratio and the hardness (Shore A) for resulting XLPO foams obtained using pressure condition 1 (1 bar; 1 min) and mold temperature of 180° C. at 7 minutes with the following foaming agents:

2 wt % ADCA in XLPO foamable Composition C (with 1wt % ZnO);
3 wt % and 4.5 wt % of FB-BA 2 in XLPO foamable Composition C (without ZnO); and
4.5 wt % of FB-BA 4 in XLPO foamable Composition C (without ZnO).

Figure 13:
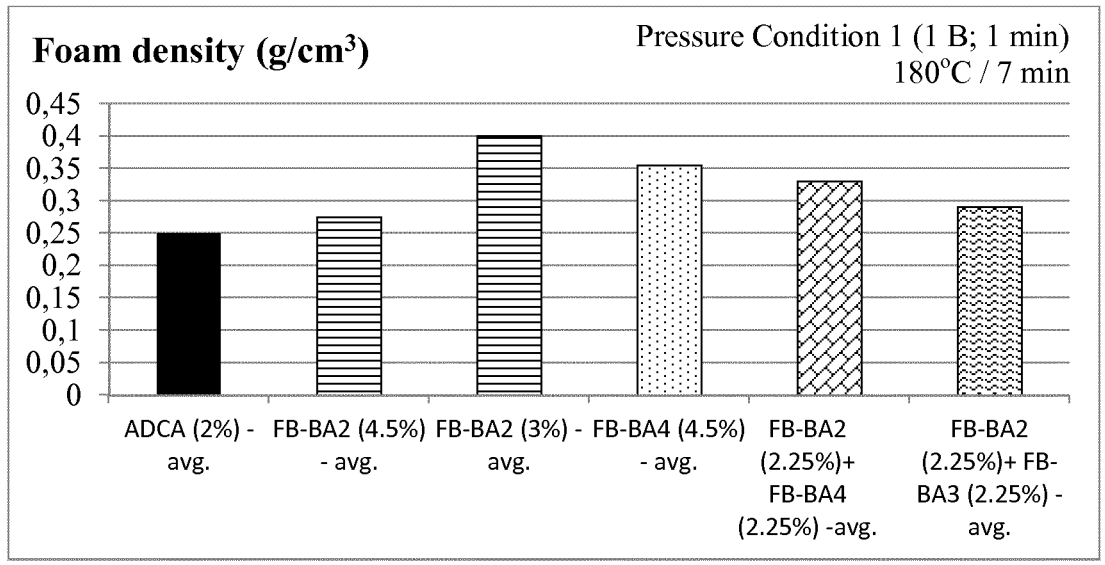
FIG. 13, FIG. 14, and FIG. 15 illustrate the foam density, the volumetric expansion ratio, and the hardness, respectively, of XLPO foams obtained with various foaming agents.
Figure 14:
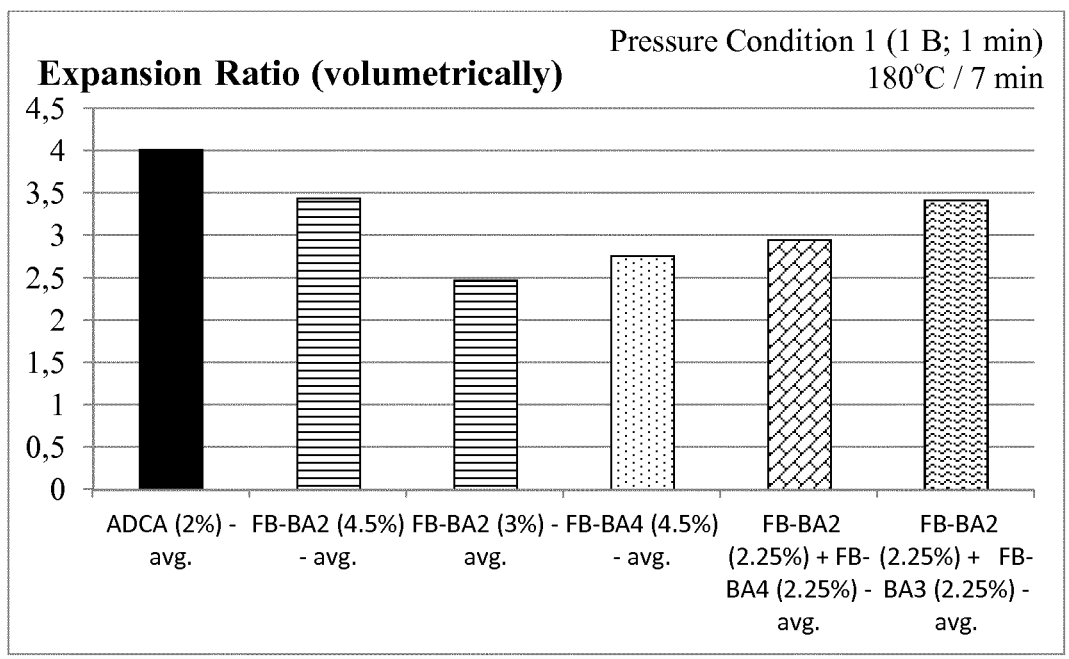
Figure 15:
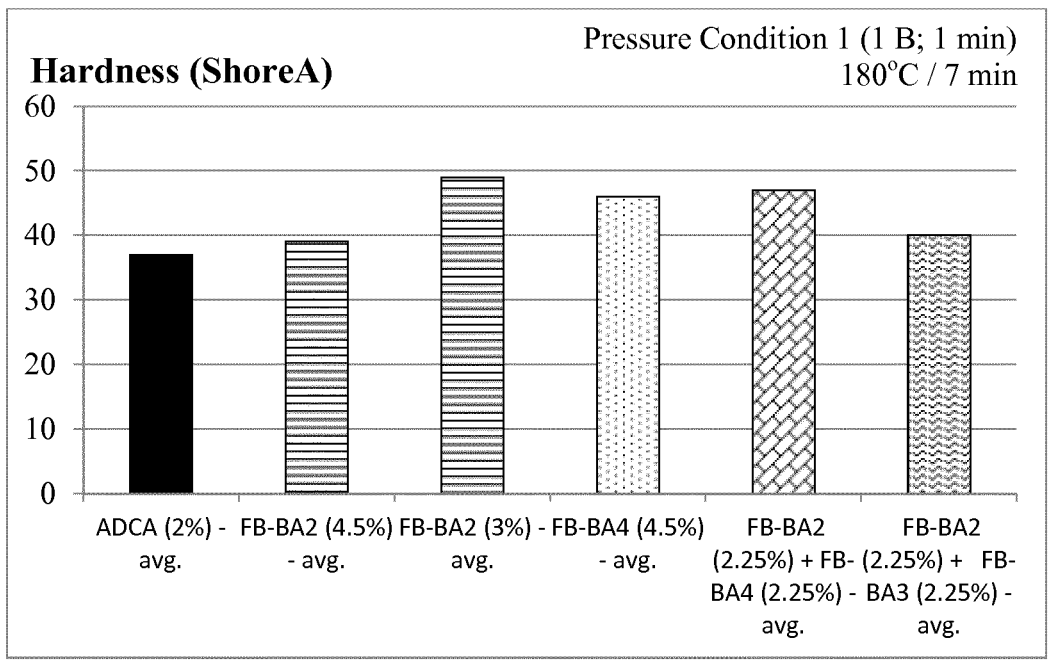

FIGS. 13-15 illustrating the foam density, the expansion ratio and the hardness of the XLPO foams obtained with the various foaming agents

TABLE 20

| Foaming agents (wt % in foamable composition) | Foam Density (g/cm$^3$) 180° C., 7 min | Expansion Ratio (volumetrically) 180° C., 7 min | Hardness (Shore A) 180° C., 7 min |
|---|---|---|---|
| ADCA (2%) + 1% ZnO (not according to invention) | 0.25 0.25 | 3.98 4.04 | 37 37 |

TABLE 20-continued

| Foaming agents (wt % in foamable composition) | Foam Density (g/cm$^3$) 180° C., 7 min | Expansion Ratio (volumetrically) 180° C., 7 min | Hardness (Shore A) 180° C., 7 min |
|---|---|---|---|
| FB-BA 2 (4.5%) without ZnO | 0.28 0.27 | 3.49 3.60 | 40 38 |
| FB-BA 2 (3%) without ZnO | 0.39 0.41 | 2.51 2.43 | 48 50 |
| FB-BA 4 (4.5%) without ZnO | 0.35 0.36 | 2.81 2.71 | 45 47 |

Figure 16:
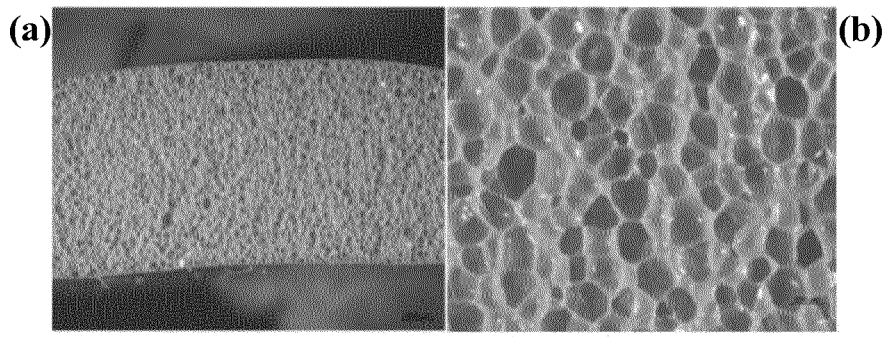
FIG. 16 provides photographs obtained by optical microscopy of XLPO foams produced via injection molding with two blowing agents: ADCA (top, FIGS. 16a and 16b) and a functionalized bicarbonate (bottom, FIGS. 16c and 16d).
Figure 16:
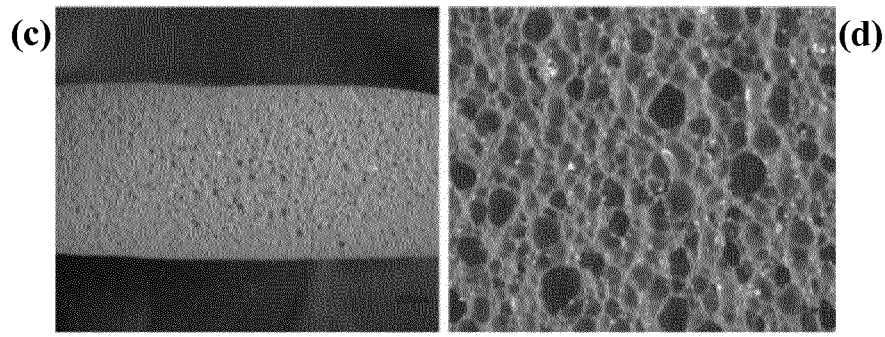

FIG. 16 provides photographs obtained by optical microscopy of XLPO foams produced at a molding temperature of about 180° C. during 7 minutes inside the mold with two blowing agents: 2 wt % ADCA (top, FIGS. 16a and 16b) and 4.5 wt % FB-BA 2 (bottom, FIGS. 16c and 16d) whose mechanical properties are provided in TABLE 20. The magnifications were at 1000 µm for FIG. 16a & FIG. 16c (left-end side photographs) and at 200 µm for FIG. 16b & FIG. 16d (right-end side photographs). The photographs were taken in the direction transversal to the injection flow.

As observed on the photographs obtained in optical microscopy in FIG. 3, the cell structure of the foam produced with the FB-BA 2 blowing agent was different than the one produced with ADCA:

Both were closed-cells foams

The cell size distribution of the ADCA-blown foam was rather homogeneous; most of the cells had a diameter of 200 µm and the number of small cell (~50 µm) was limited.

The foams produced with FB-BA 2 were characterized by cell size equal or below 250 µm; and the cell size distribution was bimodal with few large cells (200-250 µm) and a large number of small cells (~100 µm).

Thus the cell size distribution of foams produced with FB-BA 2 was bimodal with the majority of the cell sizes being smaller than what was obtained with the ADCA.

3.4 Results for Resulting XLPO Foams Using Two Functionalized Bicarbonates

XLPO foams were produced as described in the section 3.1 (under pressure condition 1) with blends of two FB-BAs mixed in with the XLPO precursor mixture "C" as shown in TABLES 18 & 19. The compositions of these blends of two FB-BAs were previously shown in TABLE 11.

The mechanical properties of these XLPO foams are shown in TABLE 21 and were compared to the XLPO foam made with ADCA in FIGS. 13-15 illustrating the foam density, the expansion ratio and the hardness of the XLPO foams obtained with the various foaming agents.

TABLE 21

| Foaming agents (wt % in foamable composition) | Foam Density (g/cm$^3$) | Expansion Ratio (volumetrically) | Hardness (Shore A) |
|---|---|---|---|
| FB-BA 2 + FB-BA 4 (1:1) | 0.32 0.34 0.34 | 3.05 2.92 2.92 | 48 47 46 |
| FB-BA 2 + FB-BA 3 (1:1) | 0.28 0.29 0.30 | 3.58 3.42 3.27 | 40 40 40 |

The disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the present application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Any element or component recited in a list of elements or components may be omitted from such list. Further, it should be understood that elements, embodiments, and/or features of processes or methods described herein can be combined in a variety of ways without departing from the scope and disclosure of the present teaching, whether explicit or implicit herein.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

The invention claimed is:

1. A foamable polymer composition comprising:
   a crosslinkable polymer, selected from the group consisting of polyolefins (PO), polyolefin elastomers (POE), polyolefin block co-polymers (OBC), ethylene vinyl acetate copolymers (EVA), EVA/PO copolymers, EVA/OBC copolymers, and combinations thereof,
   a crosslinking peroxide agent and
   a chemical blowing agent comprising a functionalized particulate bicarbonate, wherein said functionalized particulate bicarbonate comprises abietic acid, dihydroabietic acid, neoabietic acid, any ester of abietic acid, any ester of dihydroabietic acid, any ester of neoabietic acid, any salt of abietic acid, any salt of dihydroabietic acid, any salt of neoabietic acid, or any combination thereof.

2. The foamable polymer composition according to claim 1, wherein the functionalized particulate bicarbonate excludes stearic acid or a stearate salt.

3. The foamable polymer composition according to claim 1, wherein the functionalized particulate bicarbonate further comprises a second additive which liberates $CO_2$ upon heating, and wherein said second additive which liberates $CO_2$ upon heating is at least one of:
   fumaric acid,
   tartaric acid,
   citric acid, citrates, or esters of citric acid; or combination thereof.

4. The foamable polymer composition according to claim 1, wherein the chemical blowing agent does not contain an exothermic blowing agent, or wherein the chemical blowing agent does not contain a compound which liberates nitrogen or ammonia gas during heating.

5. The foamable polymer composition according to claim 1, wherein the chemical blowing agent further comprises an exothermic blowing agent.

6. The foamable polymer composition according to claim 1, wherein the functionalized particulate bicarbonate comprises at least 65% by weight and less than 100% by weight of the bicarbonate component, and from 35% or less to 0.02% by weight of the abietic acid, dehydroabietic acid, neoabietic acid, any ester of abietic acid, any ester of dihydroabietic acid, any ester of neoabietic acid, any salt of abietic acid, any salt of dihydroabietic acid, any salt of neoabietic acid, or any combination thereof.

7. The foamable polymer composition according to claim 1, wherein the functionalized particulate bicarbonate is obtained by grinding, extrusion, and/or spray coating bicarbonate particles with abietic acid, dihydroabietic acid, neoabietic acid, any ester of abietic acid, any ester of dihydroabietic acid; any ester of neoabietic acid, any salt of abietic acid, any salt of dehydroabietic acid, any salt of neoabietic acid, or combination thereof; optionally followed by subjecting the thus obtained functionalized particulate bicarbonate to milling to reduce its mean particle size.

8. The foamable polymer composition according to claim 1, excluding a blowing agent activator.

9. The foamable polymer composition according to claim 1, wherein the functionalized particulate bicarbonate further comprises silica.

10. The foamable polymer composition according to claim 1, wherein the crosslinking peroxide agent is an organic peroxide.

11. The foamable polymer composition according to claim 1, comprising from 1.5% to 6% by weight of the functionalized particulate bicarbonate.

12. The foamable polymer composition according to claim 1, the chemical blowing agent comprising the functionalized particulate bicarbonate excludes citric acid, ester of citric acid, or salts of citric acid.

13. A process for manufacturing a foamed crosslinked polymer from the foamable polymer composition of claim 1, the process comprising:
   heating the foamable polymer composition according to claim 1 in a mold at a temperature suitable for liberating $CO_2$ gas, and then
   melting and crosslinking the foamable polymer composition for a time ranging from 4 minutes to 10 minutes to form a crosslinked polymer, wherein the temperature suitable for liberating $CO_2$ gas is at or above glass transition temperature Tg and/or above melting temperature Tm of the crosslinkable polymer; and
   opening the mold resulting in expanding the crosslinked polymer to form a foamed crosslinked polymer.

14. The process for manufacturing a foamed crosslinked polymer according to claim 13, wherein, prior to heating, the foamable polymer composition is cryo-milled or calendared, wherein the temperature at or above a glass transition temperature Tg and/or above the melting temperature of the crosslinkable polymer is
   from about 180° C. to 190° C. and wherein the heating occurs in a furnace of an injection mold and the foamable polymer composition is injected into the mold for injection molding, or wherein the heating occurs in a compression mold; and wherein after opening the mold resulting in expanding of the crosslinked polymer, the foamed crosslinked polymer is cooled without applying any cooling device or cooling method.

15. A foamed crosslinked polymer obtained by the process of claim 13, wherein the foamed crosslinked polymer is selected from the group consisting of EVA, crosslinked polyolefins (XLPO), a crosslinked polyolefin block copolymers (OBC), a EVA/PO copolymers, and EVA/OBC copolymers.

16. A process for production of footwear or automotive components, comprising using the foamed crosslinked polymer of claim 15.

17. The process of claim 16, comprising using the foamed crosslinked polymer to make a shoe or sole.

* * * * *